US011240023B1

(12) United States Patent
Donlan et al.

(10) Patent No.: US 11,240,023 B1
(45) Date of Patent: Feb. 1, 2022

(54) KEY MANAGEMENT FOR EXPIRING CIPHERTEXTS

(71) Applicant: Amazon Technologies, Inc., Seattle, WA (US)

(72) Inventors: Bryan James Donlan, Seattle, WA (US); Gregory Alan Rubin, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 172 days.

(21) Appl. No.: 16/446,500

(22) Filed: Jun. 19, 2019

(51) Int. Cl.
*H04L 9/08* (2006.01)
*H04L 9/14* (2006.01)

(52) U.S. Cl.
CPC .......... *H04L 9/0891* (2013.01); *H04L 9/0861* (2013.01); *H04L 9/0894* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 10,581,820 B2 | 3/2020 | Keshava et al. | |
| 10,587,406 B1* | 3/2020 | Levin | H04L 9/0643 |
| 2002/0154782 A1* | 10/2002 | Chow | H04L 9/0891 |
| | | | 380/278 |
| 2008/0256356 A1 | 10/2008 | Iyengar et al. | |
| 2015/0074408 A1 | 3/2015 | Oberheide et al. | |
| 2015/0086018 A1* | 3/2015 | Harjula | H04L 9/0816 |
| | | | 380/277 |
| 2016/0170733 A1 | 6/2016 | Martin et al. | |
| 2016/0358388 A1 | 12/2016 | Skoglund et al. | |
| 2020/0137105 A1 | 4/2020 | Endler | |

OTHER PUBLICATIONS

Blake-Wilson et al., "Elliptic Curve Cryptography (ECC) Cipher Suites for Transport Layer Security (TLS)," Request for Comments: 4492, Informational, May 2006, 36 pages.
Blake-Wilson et al., "Transport Layer Security (TLS) Extensions," Request for Comments: 3546, Standards Track, Jun. 2003, 28 pages.
Blake-Wilson et al., "Transport Layer Security (TLS) Extensions," Request for Comments: 4366, Standards Track, Apr. 2006, 29 pages.
Blumenthal et al., "Pre-Shared Key (PSK) Ciphersuites with NULL Encryption for Transport Layer Security (TLS)," Request for Comments: 4785, Standards Track, Jan. 2007, 6 pages.
Brown et al., "Transport Layer Security (TLS) Authorization Extensions," Request for Comments: 5878, Experimental, May 2010, 19 pages.

(Continued)

*Primary Examiner* — Brandon S Hoffman
(74) *Attorney, Agent, or Firm* — Davis Wright Tremaine LLP

(57) ABSTRACT

Techniques described herein enhance information security in contexts that utilize key management systems and cryptographic keys. A cryptographic structure is utilized to maintain cryptographic keys with associated expiration times such that after an expiration time associated with a cryptographic key has passed, the cryptographic key is no longer accessible.

19 Claims, 9 Drawing Sheets

(56) References Cited

OTHER PUBLICATIONS

Chown, "Advanced Encryption Standard (AES) Ciphersuites for Transport Layer Security (TLS)," Request for Comments: 3268, Standards Track, Jun. 2002, 8 pages.

Dierks et al., "The TLS Protocol Version 1.0," Request for Comments: 2246, Standards Track, Jan. 1999, 75 pages.

Dierks et al., "The Transport Layer Security (TLS) Protocol Version 1.2," Request for Comments: 5246, Standards Track, Aug. 2008, 98 pages.

Eastlake, "Transport Layer Security (TLS) Extensions: Extension Definitions," Request for Comments: 6066, Standards Track, Jan. 2011, 25 pages.

Eronen et al., "Pre-Shared Key Ciphersuites for Transport Layer Security (TLS)," Request for Comments: 4279, Standards Track, Dec. 2005, 16 pages.

Ford-Hutchinson, "Securing FTP with TLS," Request for Comments: 4217, Standards Track, Oct. 2005, 29 pages.

Friend, "Transport Layer Security (TLS) Protocol Compression Using Lempel-Ziv-Stac (LZS)," Request for Comments: 3943, Informational, Nov. 2004, 13 pages.

Gutmann, "Encrypt-then-MAC for Transport Layer Security (TLS) and Datagram Transport Layer Security (DTLS)," Request for Comments: 7366, Standards Track, Sep. 2014, 7 pages.

Hoffman, "SMTP Service Extension for Secure SMTP over Transport Layer Security," Request for Comments: 3207, Standards Track, Feb. 2002, 9 pages.

Hollenbeck, "Transport Layer Security Protocol Compression Methods," Request for Comments: 3749, Standards Track, May 2004, 8 pages.

Kanno et al., "Addition of the Camellia Cipher Suites to Transport Layer Security (TLS)," Request for Comments: 6367, Informational, Sep. 2011, 9 pages.

Kato et al., "Camellia Cipher Suites for TLS," Request for Comments: 5932, Standards Track, Jun. 2010, 7 pages.

Khare et al., "Upgrading to TLS Within HTTP/1.1," Request for Comments: 2817, Standards Track, May 2000, 13 pages.

Kim et al., "Addition of the ARIA Cipher Suites to Transport Layer Security (TLS)," Request for Comments: 6209, Informational, Apr. 2011, 10 pages.

Krawczyk et al., "HMAC-based Extract-and Expand Key Derivation Function (HKDF)," Request for Comments 5869, Informational, May 2010, 14 pages.

Lee et al., "Addition of SEED Cipher Suites to Transport Layer Security (TLS)," Request for Comments: 4162, Standards Track, Aug. 2005, 6 pages.

Mavrogiannopoulos et al., "Using OpenPGP Keys for Transport Layer Security (TLS) Authentication," Request for Comments: 6091, Informational, Feb. 2011, 9 pages.

Mavrogiannopoulos, "Using OpenPGP Keys for Transport Layer Security (TLS) Authentication," Request for Comments: 5081, Experimental, Nov. 2007, 9 pages.

Mcgrew et al., "AES-CCM Cipher Suites for Transport Layer Security (TLS)," Request for Comments: 6655, Standards Track, Jul. 2012, 8 pages.

Mcgrew et al., "Datagram Transport Layer Security (DTLS) Extension to Establish Keys for the Secure Real-time Transport Protocol (SRTP)," Request for Comments: 5764, Standards Track, May 2010, 27 pages.

Medvinsky et al., "Addition of Kerberos Cipher Suites to Transport Layer Security (TLS)," Request for Comments: 2712, Standards Track, Oct. 1999, 7 pages.

Merkle et al., "Elliptic Curve Cryptography (ECC) Brainpool Curves for Transport Layer Security (TLS)," Request for Comments: 7027, Informational, Oct. 2013, 11 pages.

Moriai et al., "Addition of Camellia Cipher Suites to Transport Layer Security (TLS)," Request for Comments: 4132, Standards Track, Jul. 2005, 8 pages.

Newman, "Using TLS with IMAP, POP3 and ACAP," Request for Comments: 2595, Standards Track, Jun. 1999, 16 pages.

Phelan, "Datagram Transport Layer Security (DTLS) over the Datagram Congestion Control Protocol (DCCP)," Request for Comments: 5238, Standards Track, May 2008, 11 pages.

Rescorla et al., "Datagram Transport Layer Security Version 1.2," Request for Comments: 6347, Standards Track, Jan. 2012, 33 pages.

Rescorla et al., "Datagram Transport Layer Security," Request for Comments: 4347, Standards Track, Apr. 2006, 26 pages.

Rescorla et al., "Transport Layer Security (TLS) Renegotiation Indication Extension," Request for Comments: 5746, Standards Track, Feb. 2010, 16 pages.

Rescorla, "HTTP Over TLS," Request for Comments: 2818, Informational, May 2000, 8 pages.

Rescorla, "TLS Elliptic Curve Cipher Suites with SHA-256/384 and AES Galois Counter Mode (GCM)," Request for Comments: 5289, Informational, Aug. 2008, 7 pages.

Salowey et al., "AES Galois Counter Mode (GCM) Cipher Suites for TLS," Request for Comments: 5288, Standards Track, Aug. 2008, 9 pages.

Salowey et al., "Transport Layer Security (TLS) Session Resumption without Server-Side State," Request for Comments: 5077, Standards Track, Jan. 2008, 21 pages.

Salter et al., "Suite B Profile for Transport Layer Security (TLS)," Request for Comments: 6460, Informational, Jan. 2012, 15 pages.

Santesson et al., "TLS User Mapping Extension," Request for Comments: 4681, Standards Track, Oct. 2006, 11 pages.

Santesson, "TLS Handshake Message for Supplemental Data," Request for Comments: 4680, Standards Track, Sep. 2006, 10 pages.

Taylor et al., "Using the Secure Remote Password (SRP) Protocol for TLS Authentication," Request for Comments: 5054, Informational, Nov. 2007, 25 pages.

Tuexen et al., "Datagram Transport Layer Security (DTLS) for Stream Control Transmission Protocol (SCTP)," Request for Comments: 6083, Standards Track, Jan. 2011, 10 pages.

Turner et al., "Prohibiting Secure Sockets Layer (SSL) Version 2.0," Request for Comments: 6176, Standards Track, Mar. 2011, 4 pages.

\* cited by examiner

KEY MANAGEMENT FOR EXPIRING CIPHERTEXTS

CROSS-REFERENCE TO RELATED APPLICATION

This application incorporates by reference for all purposes the full disclosure of co-pending U.S. patent application Ser. No. 16/446,496, filed concurrently herewith, entitled "EXPIRING CIPHERTEXTS."

BACKGROUND

In various contexts, managing the security of computing resources is of utmost importance in many organizations. Organizations, for example, often must secure various computing resources for specific periods of time, such that after a specific period of time, the secured various computing resources become unavailable. As the size and complexities of such organizations grow, ensuring proper authentication and secure access to these computing resources can be increasingly difficult.

Many organizations rely on controlling access to various computing resources. An organization can desire to provide various computing resources for specific periods of time to various entities to maximize efficiency and achieve various other advantages. Additionally, an organization can desire to enhance the security of their own resources, such that unauthorized access can be controlled and prevented. Maintaining the expiration of secured computing resources within an organization is generally complicated, complex, and requires significant amounts of resources.

BRIEF DESCRIPTION OF THE DRAWINGS

Various techniques will be described with reference to the drawings, in which.

DETAILED DESCRIPTION

Techniques described and suggested herein relate to the securing data with an expiration time in a manner that no entity is able to access the data after the expiration time has elapsed. Processes for securing data generally involve the encryption of the data and the use of cryptographic keys, also referred to more generally as "keys." The cryptographic keys can be generated or derived through one or more cryptographic operations, and can utilize additional cryptographic keys corresponding to time intervals, which can be denoted as timestamp keys. These timestamp keys can be derived utilizing a cryptographic ratcheting structure, and can be derived sequentially corresponding to various specified time intervals. For example, for any particular day, a timestamp key can be generated for each hour of the day (e.g., a timestamp key is generated for 12:00 AM, 1:00 AM . . . etc. of the day). Additionally, the timestamp keys can be managed such that after a time indicated by a particular key has elapsed, the particular key is no longer accessible. Continuing with the above example, after 1:00 AM of the particular day has elapsed, the timestamp key generated for 1:00 AM is no longer accessible.

In various embodiments, a customer of a computing resource provider desires to encrypt data in a manner such that the data is inaccessible after a specified time, which can be denoted as an expiration time. The customer can submit requests to the computing resource provider comprising the data to be encrypted, and an expiration time. The computing resource provider can, in response to the requests, generate and utilize a timestamp key corresponding to the expiration time to encrypt the data. In an embodiment, the data is encrypted utilizing the timestamp key corresponding to the expiration time, as well as one or more other cryptographic keys. In an embodiment, after the expiration time has elapsed, the timestamp key is no longer accessible and, consequently, the encrypted data is no longer able to be decrypted. The computing resource provider can respond to the customer with the encrypted data. Upon receiving the encrypted data, the customer can perform various operations in connection with the encrypted data, such as storing the encrypted data in a data storage device or system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
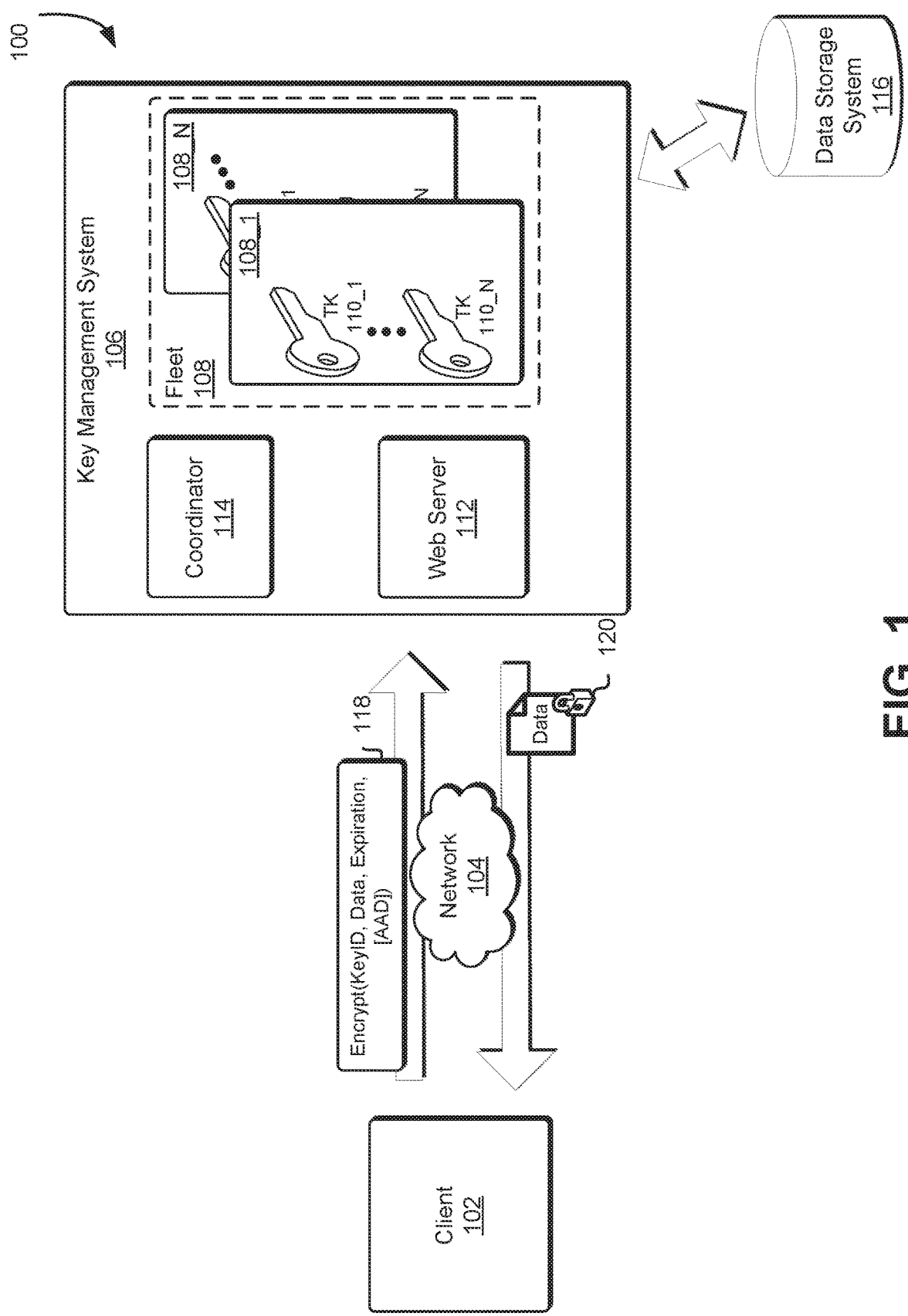
FIG. 1 shows an illustrative example of a system generating encrypted data with an expiration time, in accordance with at least one embodiment.

FIG. 1 illustrates an environment 100 in which various embodiments can be implemented. In an embodiment, FIG. 1 depicts the environment 100 in which a client 102 submits an API request 118 for data encryption via a network 104 to a key management system 106, the key management system 106 comprising a fleet 108, a web server 112, a coordinator 114, and access to a data storage system 116. While particular components of the key management system are shown and described for the purpose of illustration, key management systems in accordance with the present disclosure can have additional components and otherwise be configured. In an embodiment, the key management system 106 returns, in response to the API request 118, an encrypted data 120 to the client 102 via the network 104 in response to the API request 118.

In an embodiment, the key management system 106 provides a variety of cryptography-related services. To provide such services, the key management system 106 can include a network of one or more local devices, such as a hardware security module (HSM), a trusted platform module (TPM), a cryptographic processor, and/or variations thereof.

In an embodiment, a hardware security module is a device comprising a set of processors (including a secure cryptoprocessor) and logic (e.g. in the form of executable instructions) that is executable to cause the hardware security module to receive or otherwise obtain requests to perform cryptographic operations, cause the secure cryptoprocessor to perform the cryptographic operations, and transmit or otherwise provide results of performing the cryptographic operations. Additionally, the key management system 106 can include one or more instances of a physical computing instance, such as a physical server computer, or one or more instances of a virtual computing instance, such as a virtual machine, which can be hosted on one or more computer servers. In an embodiment, the key management system 106 comprises the fleet 108, web server 112, and coordinator 114, as well as various other components and/or systems. In an embodiment, the web server 112 is a collection of one or more physical and/or virtual computing resources, configured to receive and/or serve requests, data, and/or variations thereof, on behalf of the key management system 106. In an embodiment, the coordinator 114 is a collection of one or more physical and/or virtual computing resources, configured to manage the fleet 108.

The fleet 108 can comprise a network of HSMs 108_1 to 108_N, in which each HSM stores, in one or more data stores the HSM can comprise, a cryptographic ratcheting structure that is utilized to generate/maintain timestamp keys ("TK") 110_1 to 110_N. In an embodiment, a cryptographic ratcheting structure is a data structure that stores one or more nodes of a tree such as used herein, where a stored node can be cryptographically ratcheted to determine another node of the tree. Note that the cryptographic ratcheting structure, in an embodiment, does not store all nodes of the tree, but a subset of the nodes of the tree, such as a set of nodes that is sufficient to generate nodes of the tree corresponding to unexpired trees but that is insufficient to generate any expired node of the tree. In some examples, a timestamp key can be a cryptographic key, passphrase, secret code, biometric authentication information and/or variations thereof. In various embodiments, the timestamp key can be a cryptographic key such as an Advanced Encryption Standard ("AES") 128-, 192-, or 256-bit key, a Triple DES (3DES) key, and/or variations thereof. The fleet 108 can comprise any positive N number of HSMs, from HSM 108_1 ending with HSM 108_N. In an embodiment, the timestamp keys 110_1 to 110_N are cryptographic secrets and/or cryptographic protection keys, which are keys suitable for use in a cryptographic algorithm that cryptographically protects an aspect of data, such as by providing secrecy and/or authenticity of the data. The timestamp keys 110_1 to 110_N can be utilized in conjunction with various other cryptographic protection keys to generate other cryptographic protection keys. In an embodiment, the contents of each HSM of the network of HSMs 108_1 to 108_N are maintained utilizing a consensus protocol, such as the Paxos consensus protocol, which can ensure the contents of each HSM of the network of HSMs 108_1 to 108_N are identical and consistent with the other HSMs of the network of HSMs 108_1 to 108_N. Note while the present disclosure uses keys (examples of cryptographic material) for the purpose of illustration, embodiments described herein can be used with other cryptographic material, which is information comprising at least one secret used for input into cryptographic algorithms, such as encryption, decryption, and/or digital signature algorithms.

In an embodiment, each HSM of the network of HSMs 108_1 to 108_N comprises the same cryptographic ratcheting structure. The cryptographic ratcheting structure can be utilized to derive the timestamp keys 110_1 to 110_N. In various embodiments, the timestamp keys 110_1 to 110_N are derived from a root key, which can be denoted as a root timestamp key, utilizing a key derivation function. In an embodiment, a key derivation function is a set of one or more pseudorandom functions, such as a keyed cryptographic hash function, that derive cryptographic keys from one or more input values. The input values can include other cryptographic keys, plaintext, ciphertext, and/or various combinations thereof. In some examples, a key derivation function can derive a cryptographic key by concatenating and/or consolidating one or more of the input values, and performing various mathematical operations on one or more of the input values. In some examples, a key derivation function can be hash-based message authentication code (HMAC) based, such as the HMAC based key derivation function (KDF) described in RFC (Request For Comments) 5869. The HMAC based KDF can include, but is not limited to, cryptographic hash functions such as the secure hash algorithm (SHA) family. Examples of the potential SHA utilized can include SHA-224, SHA-256, SHA-384, SHA-512, and/or variations thereof. Other variations of a key derivation function are also considered as being within the scope of the present disclosure.

In an embodiment, the cryptographic ratcheting structure is utilized to derive the timestamp keys 110_1 to 110_N sequentially according to a specified time interval from a specified starting point. For example, a specified starting point can be chosen to be the UNIX epoch, or 00:00:00 UTC Jan. 1, 1970, and a specified time interval can be chosen to be 24 hours. Continuing with the above example, the timestamp keys 110_1 to 110_N would be derived for every 24 hours starting from 00:00:00 UTC Jan. 1, 1970 (e.g., timestamp key 110_1 would correspond to 00:00:00 UTC Jan. 1, 1970, timestamp key 110_2 would correspond to 00:00:00 UTC January $2^{nd}$, 1970, and so on). Additionally, the timestamp keys 110_1 to 110_N can be derived up until any arbitrary point in the time (e.g., an end time could be determined to be Dec. 25, 3000, in which the final timestamp key 110_N would correspond to the time 00:00:00 UTC Dec. 25, 3000). In some embodiments, the timestamp keys 110_1 to 110_N are not necessarily stored within each HSM of the network of HSMs 108_1 to 108_N. In an embodiment, only the essential timestamp keys of the timestamp keys 110_1 to 110_N are stored within each HSM of the network of HSMs 108_1 to 108_N such that all of the timestamp keys of the timestamp keys 110_1 to 110_N that correspond to current, non-expired and future times are able to be derived, or accessed, and all of the timestamp keys of the timestamp keys 110_1 to 110_N that correspond to past times are not able to be derived, or otherwise accessed. Further information regarding the cryptographic ratcheting structure and the timestamp keys can be found in the descriptions of FIGS. 2-5. In some examples, the cryptographic ratcheting structure each HSM of the network of HSMs 108_1 to 108_N comprises can be any variation of the cryptographic ratcheting structures depicted in FIGS. 2-5, and can include any combination/variation of the structures. For example, the cryptographic ratcheting structure can comprise a horizontal top level like the structure depicted in FIG. 4, in which each key on the horizontal top level can be utilized to derive a structure like the structure depicted in FIG. 2.

In an embodiment, the coordinator 114 is a collection of one or more physical and/or virtual computing resources, configured with software instructions to manage the fleet 108. In various embodiments, the coordinator 114 can be implemented as a software process running on each HSM of the network of HSMs 108_1 to 108_N. In an embodiment, the coordinator 114 manages the fleet 108 such that after a time indicated by a specific timestamp key has elapsed, that specific timestamp key becomes inaccessible. For example, a timestamp key can be derived for the time 00:00:00 UTC Jan. 1, 2019. Continuing with the example, the timestamp key can be stored within each HSM of the network of HSMs 108_1 to 108_N. Continuing with the example, after the time 00:00:00 UTC Jan. 1, 2019 has elapsed, the coordinator 114 can delete, erase, rewrite, or otherwise destroy the timestamp key within HSM 108_1, and utilize a consensus protocol such that the timestamp key is destroyed in each HSM of the network of HSMs 108_1 to 108_N. In various embodiments, the coordinator 114 continuously analyzes the fleet 108 to determine and/or destroy timestamp keys that enable access to timestamp keys corresponding to times that have elapsed.

The key management system 106 can operate a cryptography service; generally, a cryptography service can be a collection of computing resources (e.g., servers, databases, HSMs, networking equipment, and the like) collectively configured to manage and use cryptographic keys for customers of the key management system 106. Keys used by the key management system 106 can have associated identifiers that the customers can reference when submitting requests to perform cryptographic operations (such as encryption, decryption, and message signing) and/or other operations, such as key rotation. The key management system 106 can securely maintain the cryptographic keys to avoid access by unauthorized parties. The key management system 106 can also provide encryption keys. In an embodiment, an "encryption key" is an example of a cryptographic protection key, which is a key suitable for use in a cryptographic algorithm (e.g., encryption algorithm, decryption algorithm, digital signature algorithm) that cryptographically protects an aspect of data, such as by providing secrecy and/or authenticity of the data.

The client 102 can be any entity operable to access systems such as the key management system 106 and/or the data storage system 116. In some examples, the client 102 can be one or more instances of a physical computing instance, such as a physical server computer, or one or more instances of a virtual computing instance, such as a virtual machine, which can be hosted on one or more computer servers. Additionally, the client 102 can include one or more processors, and memory storing instructions executable by the one or more processors. Other variations are also considered as being within the scope of the present disclosure. The client 102 can communicate to the key management system 106 and/or the data storage system 116 through one or more communication networks 104, such as the Internet. Further, the various communications to/from the client 102 can be orchestrated by a browser or other application executing on the client 102.

In various embodiments, the data storage system 116 stores data objects on behalf of users of the data storage system 116. The data storage system 116 can be a collection of computing resources, physical and/or virtual, configured to operate, store, and/or access data. The data storage system 116 can store data objects on one or more physical computing instances, such as a physical computing server, or one or more virtual computing instances, such as a virtual machine; these computing instances can also be a part of a larger network of computing instances. Additionally, the data storage system 116 can store the data in a single and/or multiple parts. Generally, it should be understood that unless explicitly contradicted or otherwise clear from context, the storage of data, within one or more systems, can be performed in any suitable manner, such as in a single location, multiple locations (i.e. by storing the data in pieces over multiple locations), or otherwise.

In an embodiment, the client 102 communicates to the key management system 106 via API (application programming interface) requests 118, specifically web service API requests, which are received and processed via the web server 112. It should be noted that receiving the API request 118 by the key management system 106 can be performed in various ways in accordance with various embodiments. The client 102 can utilize a cryptographically protected communications session via the network 104 that comprises communication with the key management system 106. In various examples, the network 104 can utilize a protocol or application such as TLS (transport layer security), SSL (secure sockets layer), SSH (secure socket shell), VPN (virtual private network), and/or variations thereof to implement a cryptographically protected communications session. Additionally, the network 104 can include any appropriate network, including an intranet, the Internet, a cellular network, a local area network, a satellite network or any other such network and/or combination thereof.

The client 102 can submit appropriately configured API requests 118 to the key management system 106 through one or more web service interfaces. An API request can be considered to be appropriately configured if it is formatted sufficiently and contains information (e.g., authentication information such as a digital signature or other credential or information generated from a credential) sufficient to cause a receiving system to fulfill the request. Generally, it should be understood that unless explicitly contradicted or otherwise clear from context, the movement of data, and interactions, from one system to another can be performed in any suitable manner, such as in a single transmission, by streaming (i.e. by transmitting the data in pieces over multiple transmissions), or otherwise.

The key management system 106 can implement a request API 118, which, in an embodiment, is an API configured for requesting operations to be performed by the key management system 106. In some examples, the request API 118 may be configured with the following high-level requests available:

CreateKey(KeyID)
  Encrypt(KeyID, Data, Expiration, [AAD])
  Decrypt(KeyID, Ciphertext, [AAD])
  GenerateDataKey(KeyID)

A CreateKey(KeyID) request, in an embodiment, causes the key management system 106 to create a key identified by "KeyID" identified in the request. Alternative embodiments can designate the name of the request performing the CreateKey(KeyID) functionality as create(KeyID), key (KeyID), and/or variations thereof. Upon receipt of a request, the key management system 106 can generate a key and associate the key with "KeyID." It should be noted that "KeyID" can be, but are not necessarily unique identifiers. For instance, "KeyID" can identify a family of keys. It should be noted that, when "KeyID" does not uniquely identify a key, various systems can be in place to enable proper functionality. For example, in various embodiments, a family of keys identified by "KeyID" is finite. If a decryption operation using a key identified by "KeyID" is requested, additional data (e.g., a time stamp of when the encryption was performed) can enable determining the proper key to use. In some embodiments, ciphertexts can include information indicating a key version. In some embodiments, all possible keys are used to provide different decryptions of the data. Since there are a finite number of keys, the proper decryption can be selected from those provided. In some embodiments, decryption with a key is performed in a manner that enables the key management system 106 to detect that the ciphertext was not generated based at least in part on the key, such as by using authenticated encryption. Other variations are also considered as being within the scope of the present disclosure.

An Encrypt(KeyID, Data, Expiration, [AAD]) request can be used to cause the key management system 106 to encrypt specified data, indicated by "Data", using a key identified by the "KeyID." The specified data to be encrypted can be indicated in various forms by "Data." In various embodiments, "Data" comprises the specified data itself, represented as a sequence of bits. In alternative embodiments, "Data" comprises a uniform resource identifier ("URI") that identifies the specified data, which can exist on various systems, such as one or more web servers, one or more data stores, and/or variations thereof. "Expiration" can specify a time in which the specified data to be encrypted can no longer be decrypted, or accessed. In various embodiments, "Expiration" is a specific time/date (e.g. 00:00:00 UTC Jan. 1, 2020), in which after the specified time/date has elapsed, the specified data to be encrypted is no longer accessible or able to be decrypted. Note, however, that expirations can be expressed in other ways, such as by an amount of time (e.g., specified in years or some other unit) or by something that indirectly specifies an expiration, such as a compliance regime according to which data should become inaccessible after a certain amount of time. Expirations may also be indirectly specified in other ways, such as by customer-specified policy applicable to the API requests.

Additional Authenticated Data ("AAD") can be used for various purposes and can be data that is not necessarily encrypted, but that is authenticated, e.g., by a digital signature, a message authentication code or, generally, a keyed hash value included with "AAD." In some embodiments, the ciphertext is generated including at least a portion of "AAD." In some other embodiments, "AAD" is provided separately during decryption. In some other embodiments, "AAD" is generated at decryption time based at least in part on the request and or other metadata such that decryption will only succeed when the metadata passes. In some embodiments, access control policy (referred to simply as "policy") can constrain whether a cryptographic operation can be performed with respect to a particular "AAD." Processing of Encrypt(KeyID, Data, Expiration, [AAD]) requests can require, by programming logic and/or policy enforced by the key management system 106, both that "AAD" contains particular values and that "AAD" be authentic (e.g., not modified since original transmission). Similarly, a Decrypt(KeyID, Ciphertext, [AAD]) request can be used to cause the key management system 106 to decrypt the specified ciphertext, indicated by "Ciphertext," using a key identified by "KeyID." "AAD" in the Decrypt(KeyID, Ciphertext, [AAD]) request can be used such as described above. For instance, processing of the Decrypt(KeyID, Ciphertext, [AAD]) can require, by programming logic and/or policy enforced by the key management system 106, both that "AAD" contains particular values and that "AAD" be authentic (e.g., not modified since original transmission).

A GenerateDataKey(KeyID) request can be used to cause the key management system 106 to generate an encrypted data key using a key identified by "KeyID." Alternative embodiments can designate the name of the request performing the GenerateDataKey(KeyID) functionality as get (KeyID), getKey(KeyID), and/or variations thereof. Upon receipt of a request, the key management system 106 can generate a key and encrypt the generated key using a key specified by "KeyID." In some embodiments, the request can generate a plaintext data key and the corresponding ciphertext copy of the data key, encrypted by the key identified by "KeyID."

In an embodiment, the client 102 desires to encrypt data with a specified key and an expiration time in which following the expiration time, the encrypted data is no longer able to be decrypted or accessible. In an embodiment, the client 102 submits the API request 118 via the network 104 to the key management system 106. In various examples, the API request 118 is submitted utilizing a cryptographically protected communications session the network 104 can comprise. The API request 118 can comprise the Encrypt(KeyID, Data, Expiration, [AAD]) API request, and can specify the data to be encrypted, denoted by "Data," the key to be utilized to encrypt the data, denoted by "KeyID," the expiration time of the data to be encrypted, denoted by "Expiration," as well as other additional information, denoted by "AAD."

The API request 118 can be received by the key management system 106 via the web server 112 through the network 104. The key management system 106 can determine the key specified by the "KeyID" of the API request 118. In various examples, the key specified by the "KeyID" of the API request 118 can be stored in various storage locations, such as the key management system 106, data storage system 116, and/or variations thereof. Additionally, the key specified by the "KeyID" of the API request 118 can be stored in an encrypted form; the key can be encrypted by an additional key, which can be denoted as a fleet key, which can be stored on the key management system 106, data storage system 116, and/or variations thereof.

In an embodiment, the key management system 106 retrieves the key specified by the "KeyID" of the API request 118. In some examples, the key specified by the "KeyID" of the API request 118 can be denoted as the client key, and can be stored in encrypted form on one or more data storage systems. For example, the key management system 106 can retrieve the key in encrypted form from the data storage system 116. Continuing with the example, the key management system 106 can utilize a key, which can be denoted as a fleet key, that is stored within an HSM the key management system 106 comprises to decrypt the retrieved encrypted key within the HSM. Continuing with the example, the decrypted key can only be accessible through the HSM, and only exists in plaintext within the HSM. In various examples, the fleet key is stored in an HSM that the fleet 108 comprises. As an alternative example, the key management system 106 can retrieve the key from one or more data stores the key management system 106 can comprise.

In an embodiment, the key management system 106 retrieves the timestamp key corresponding to the expiration time specified by the "Expiration" of the API request 118 from the fleet 108. For example, if the expiration time specified by the "Expiration" of the API request 118 is 00:00:00 UTC Jan. 1, 2020, the key management system 106 can retrieve the timestamp key corresponding to 00:00:00 UTC Jan. 1, 2020. In some examples, if the fleet 108 does not comprise a timestamp key corresponding the expiration time specified by the "Expiration" of the API request 118, a timestamp key corresponding to the time closest to the expiration time can be retrieved. In an example embodiment, for a given timestamp key system, a specified starting point is chosen to be the UNIX epoch, or 00:00:00 UTC Jan. 1, 1970, and a specified time interval is chosen to be 24 hours. Continuing with the embodiment, an expiration time specified by the "Expiration" of the API request 118 is 10:01:00 UTC Jan. 1, 2020; however a timestamp key corresponding to the expiration time does not exist within the given timestamp key system. Continuing with the embodiment, the timestamp key for the time 00:00:00 UTC Jan. 1, 2020 is retrieved as the time 00:00:00 UTC Jan. 1, 2020 is closest to the expiration time. In some alternative examples, if the fleet 108 does not comprise a timestamp key corresponding the expiration time specified by the "Expiration" of the API request 118, the key management system 106 can return an error message indicating that the expiration time specified by the "Expiration" of the API request 118 is not valid.

The key management system 106 can retrieve the timestamp key by accessing the network of HSMs 108_1 to 108_N within the fleet 108. In an embodiment, the key management system 106 retrieves the timestamp key by utilizing the cryptographic ratcheting structure each HSM of the network of HSMs 108_1 to 108_N comprises to derive the timestamp key, and retrieving the derived timestamp key from any HSM of the network of HSMs 108_1 to 108_N. For example, the key management system 106 can utilize the cryptographic ratcheting structure HSM 108_1 comprises to derive the timestamp key, and retrieve the derived timestamp key from the HSM 108_1. In an alternative embodiment, each HSM of the network of HSMs 108_1 to 108_N comprises the timestamp key, in which the key management system 106 directly retrieves the timestamp key from any HSM of the network of HSMs 108_1 to 108_N. In various embodiments, if the expiration time specified by the "Expiration" of the API request 118 has already passed, the key management system 106 can return an error message indicating that the expiration time has passed to the client 102.

In an embodiment, the key management system 106 encrypts the data specified by the "Data" of the API request 118. The key management system 106 can encrypt the data by utilizing the timestamp key as well as the client key. In various embodiments, the key management system 106 encrypts the data 120 utilizing an encryption algorithm. In some examples, an encryption algorithm is one or more cryptographically strong algorithms, such as algorithms that encrypt data in a manner rendering the encrypted data impractical to decrypt without access to a secret cryptographic protection key, such as the timestamp key and/or client key, usable to decrypt the data. The processes of an encryption algorithm on a data object can result in cryptographically protected data. An encryption algorithm can also include one or more of the following cryptographic processes: encryption, digital signatures, or otherwise generating data that provides secrecy and/or integrity of the data. An encryption algorithm can be performed to encrypt data, such as the data specified by the "Data" of the API request 118, using a cryptographic cipher that uses the timestamp key and/or the client key as inputs. In some examples, the timestamp key and/or client key can symmetric keys of private key cryptosystems, also known as symmetric key algorithms. Examples of cryptographic ciphers within symmetric key algorithms include, for example, modes of the Advanced Encryption Standard (AES), Blowfish, Data Encryption Standard (DES), Triple DES, Serpent, Twofish, Threefish, and/or variations thereof. In some examples, the data can be encrypted utilizing a key generated from the timestamp key and client key in a key derivation function. In an embodiment, the key management system 106 utilizes the timestamp key and client key in a key derivation function to produce a cryptographic key to encrypt the data via an encryption algorithm to produce the encrypted data 120.

In an embodiment, the key management system 106 provides the encrypted data 120 to the client 102 via the network 104. In some examples, the key management system 106 can provide the encrypted data 120 through a cryptographically protected communications session the network 104 can comprise. The client 102 can receive the encrypted data 120 and perform various actions in connection with the encrypted data 120, such as storing the encrypted data 120 in one or more data storage systems, and/or variations thereof. In various embodiments, the encrypted data 120 comprises metadata that indicates the expiration time specified by the "Expiration" of the API request 118. In an embodiment, the encrypted data 120 is encrypted such that after the expiration time indicated by "Expiration" of the API request 118 has elapsed, the encrypted data 120 is no longer able to be decrypted.

Figure 2:
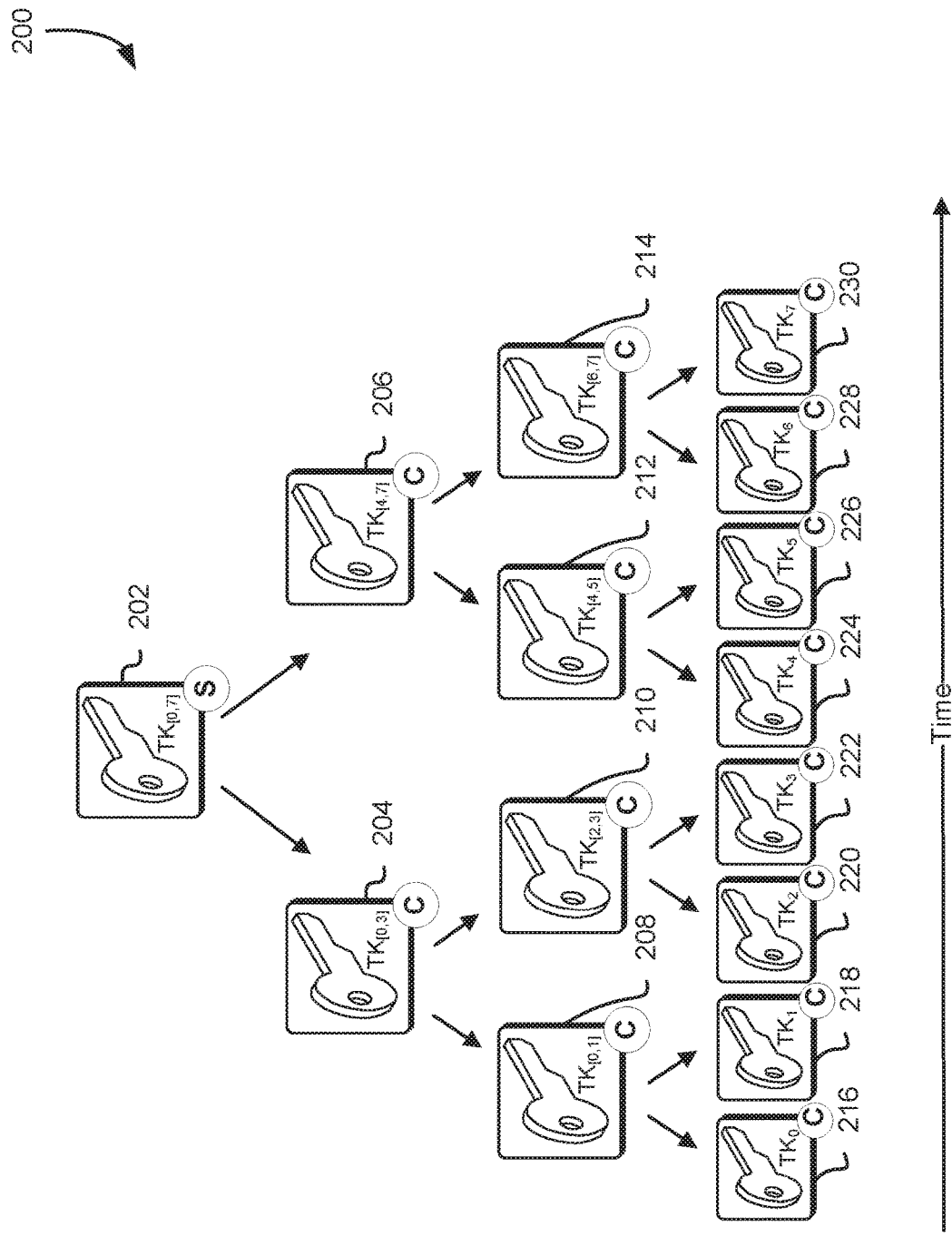
FIG. 2 shows an illustrative example of a cryptographic ratcheting structure, in accordance with at least one embodiment.
Figure 2:
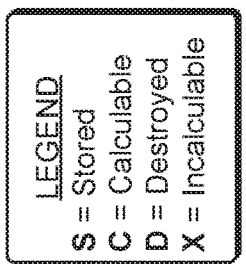

FIG. 2 illustrates an example 200 in which various embodiments can be implemented. In an embodiment, FIG. 2 depicts the example 200 comprising a cryptographic ratcheting structure, which can be denoted as a tree, utilizing cryptographic secrets, denoted as timestamp keys ("TK"), corresponding to ranges of time or specific times. In the example of FIG. 2, the tree depicted comprises multiple levels (e.g., where a level comprises nodes on the same time horizon) where, each level divides time intervals at different granularity, where the further the level is from the root, the higher granularity the nodes on that level divide time. For example, in the illustrative example of FIG. 2, the first level (the root of the tree) represents a range of time for which the tree is valid. The second level, in this example, divides the range of the first level into two consecutive ranges. Continuing the example, the third level divides each of the ranges of the second level into two consecutive ranges (thereby dividing the range of the first level into four consecutive ranges). In this example, therefore, the $n^{th}$ level of the tree divides the time range for which the tree is valid into $2^{n-1}$ consecutive ranges, assuming the top level is labeled as the first level. In an embodiment, $TK_{[0,7]}$ corresponds to a range of time from t=0 to t=7, and $TK_1$ corresponds to a specific time t=1, in which the variable t corresponds to a discrete representation of time such that each unit oft represents a predetermined interval of time (e.g., one second, minute, hour, or day), and t=0 corresponds to the UNIX epoch, or 00:00:00 UTC, Jan. 1, 1970. In an alternative embodiment, t=0 can correspond to any arbitrary point in time, such as a time when the ratcheting structure is initiated. The predetermined interval of time, corresponding to a single unit of t, can be based on various factors. For example, an interval could be determined to be one second, in which t=1 would represent the time 1 second after the time determined to be t=0, and so on. As an alternative example, an interval could be determined to be one day, or 24 hours, in which t=1 would represent the time 24 hours after the time determined to be t=0. In an embodiment, FIG. 2 depicts the cryptographic ratcheting structure that each HSM of the network of HSMs 108_1 to 108_N comprises, as described in connection with FIG. 1, at initialization. Furthermore, in an embodiment, at any given moment in time, only a maximum of three keys of the cryptographic ratcheting structure are stored within each HSM of the network of HSMs 108_1 to 108_N. In various other embodiments, the maximum number of keys stored corresponds to the number of levels, not including the root key, of a cryptographic ratcheting structure (e.g., the cryptographic ratcheting structure depicted in FIG. 2 comprises three levels, not including the root key, corresponding to a maximum of three keys stored).

The cryptographic ratcheting structure can be derived beginning with key 202, which can be denoted as the root key, which may be randomly generated or generated using a key derivation function. In various embodiments, keys of the cryptographic ratcheting structure are derived from one or more keys above them within the cryptographic ratcheting structure. For example, keys 204 and 206 can be derived from the key 202; key 204 can be derived from the key 202 utilizing a key derivation function that utilizes the key 202 and a string corresponding to the key 204 as inputs (e.g., key 204=KDF(key 202, "key204"), and a similar process can be utilized to derive the key 206. Furthermore, the keys of the cryptographic ratcheting structure can be derived utilizing a key derivation function. Additionally, a key derivation function can be utilized in the cryptographic ratcheting structure such that the original input values cannot be reconstructed from the output value (e.g., keys derived (i.e., ratcheted) from a key cannot be used to reconstruct the original key). Note that other one-way functions (i.e., functions that are computationally impractical to invert) are also considered as being within the scope of the present disclosure.

In an embodiment, the cryptographic ratcheting structure is a variation of one or more binary trees. The cryptographic ratcheting structure can be derived like a binary tree. For example, the key 202 can be obtained through one or more processes, such as through a key derivation function, various mathematical functions, from one or more data stores, and/or variations thereof, and can be denoted as a parent node. The key 202 can be utilized to derive the keys 204 and 206 (i.e., the key 202 yields keys 204 and 206), which can be denoted as child nodes of the key 202. Continuing with the example, a key derivation function can be utilized with the key 202 and an input string representing the range of t=0 to t=3 (e.g., "[0,3]") to derive the key 204. Continuing with the example, a different key derivation function can be utilized with the key 204 and an input string representing the range of t=0 to t=1 (e.g., "[0,1]") to derive the key 208. Further continuing with the example, a different key derivation can be utilized with the key 208 and an input string representing the time t=0 (e.g., "0") to derive the key 216 (a leaf node in the tree of FIG. 2, along with keys 218-230), and a different key derivation function can be utilized with the key 208 and an input string representing the time t=1 (e.g., "1") to derive the key 218. In various examples, a similar method can be utilized to derive the key 210 from the key 204, keys 220 and 222 from key 210, key 206 from the key 202, keys 212 and 214 from the key 206, keys 224 and 226 from the key 212, and keys 228 and 230 from key 214. It should be noted that, in various embodiments, the inputs to each key derivation function can differ, and can depend on various factors. For example, the key 204 can be derived from the key 202 through a key derivation function that utilizes the key 202, as well as a random character string that can be stored on one or more data stores, as inputs. Note, however, that other embodiments utilize tree structures that have nodes of degree different from two, where the degree of a node denotes the number of child nodes of that node. For example, in some embodiments, a tree structure has non-leaf nodes of uniform degree greater than 2. In other embodiments, a tree structure has non-leaf nodes of non-uniform degree. In this manner, by varying the degree of nodes in the tree structure, different tradeoffs between storage space and computational efficiency can be achieved. Further, while embodiments described herein comprise levels in the tree with corresponding nodes having respective non-overlapping intervals, embodiments of the present disclosure include variations where keys of a level in a tree may have overlapping intervals such that two different keys in the level may be used to derive two different keys that are unexpired at the same time. In some embodiments, nodes of a level may correspond to ranges that are subsets/supersets of one another. For instance, in one embodiment, at a level, one node corresponds to a first range, another node corresponds to a second range within the first range, yet another node corresponds to a third range within the second range, and so forth.

In an embodiment, the cryptographic ratcheting structure is not completely realized, but has nodes with different states. In an embodiment, there are at least four distinct states for each timestamp key: stored, calculable, destroyed, and incalculable. A key that is stored, or in the "stored" state, can refer to a key that has been generated and stored on one or more data stores. In an embodiment, a key in the "stored" state is stored within each HSM of the network of HSMs 108_1 to 108_N as part of the cryptographic ratcheting structure each HSM of the network of HSMs 108_1 to 108_N comprises. A key that is calculable, or in the "calculable" state, can refer to a key that is not stored (e.g., because it has not yet been generated), but is able to be calculated or derived from a set of keys that is stored. For example, in an embodiment, key 204 is in the "calculable" state, in which key 204 has not been generated or stored, but is able to be calculated or derived from the key 202. In an embodiment, an indication, such as a sequence of bits, that denotes that a key is in the "calculable" state is stored in place for each key in the "calculable" state within the cryptographic ratcheting structure, which each HSM of the network of HSMs 108_1 to 108_N comprises, although in other embodiments such indications are not stored for keys not having the stored state.

A key that is destroyed, or in the "destroyed" state, can refer to a key that has been previous generated and stored, and then has been destroyed, or securely erased. In various examples, a key can be destroyed by rewriting the storage space(s) in which the key was stored; in an embodiment, a key that has been destroyed is not recoverable in any capacity. In an embodiment, an indication, such as a sequence of bits, that denotes that a key is in the "destroyed" state is stored in place for each key in the "destroyed" state within the cryptographic ratcheting structure, which each HSM of the network of HSMs 108_1 to 108_N comprises, although in other embodiments, such indications are not stored for keys having the destroyed state. A key that is incalculable, or in the "incalculable" state, can refer to a key that has not been generated or stored, but is not able to be calculated in any capacity. In an embodiment, an indication, such as a sequence of bits, that denotes that a key is in the "incalculable" state is stored in place for each key in the "incalculable" state within the cryptographic ratcheting structure, which each HSM of the network of HSMs 108_1 to 108_N comprises. In some embodiment, destroyed and incalculable states are treated as the same state in the sense that an incalculable key (as described above) is indirectly destroyed by the direct destruction of another key that is needed to derive the incalculable key. Moreover, as evident from the above description, some state transitions are possible (e.g., stored to destroyed or calculable to incalculable) while others are not (e.g., destroyed to stored or incalculable to calculable).

In an embodiment, FIG. 2 depicts the cryptographic ratcheting structure that each HSM of the network of HSMs 108_1 to 108_N comprises at initialization. In some examples, initialization can refer to the time before the time that t=0 is determined to be. For example, t=0 can be determined to be the UNIX epoch, in which initialization can refer to the time before the UNIX epoch. In an embodiment, t=0 is the UNIX epoch, or 00:00:00 UTC, Jan. 1, 1970, in which the cryptographic ratcheting structure depicted in FIG. 2 is the cryptographic ratcheting structure present in each HSM of the network of HSMs 108_1 to 108_N for any time before the UNIX epoch. In an embodiment, the cryptographic ratcheting structure depicted in FIG. 2 comprises the key 202, which is stored, and keys 204-230, which are calculable based off of key 202, which have indications denoting the "calculable" state stored in their places.

Figure 3:
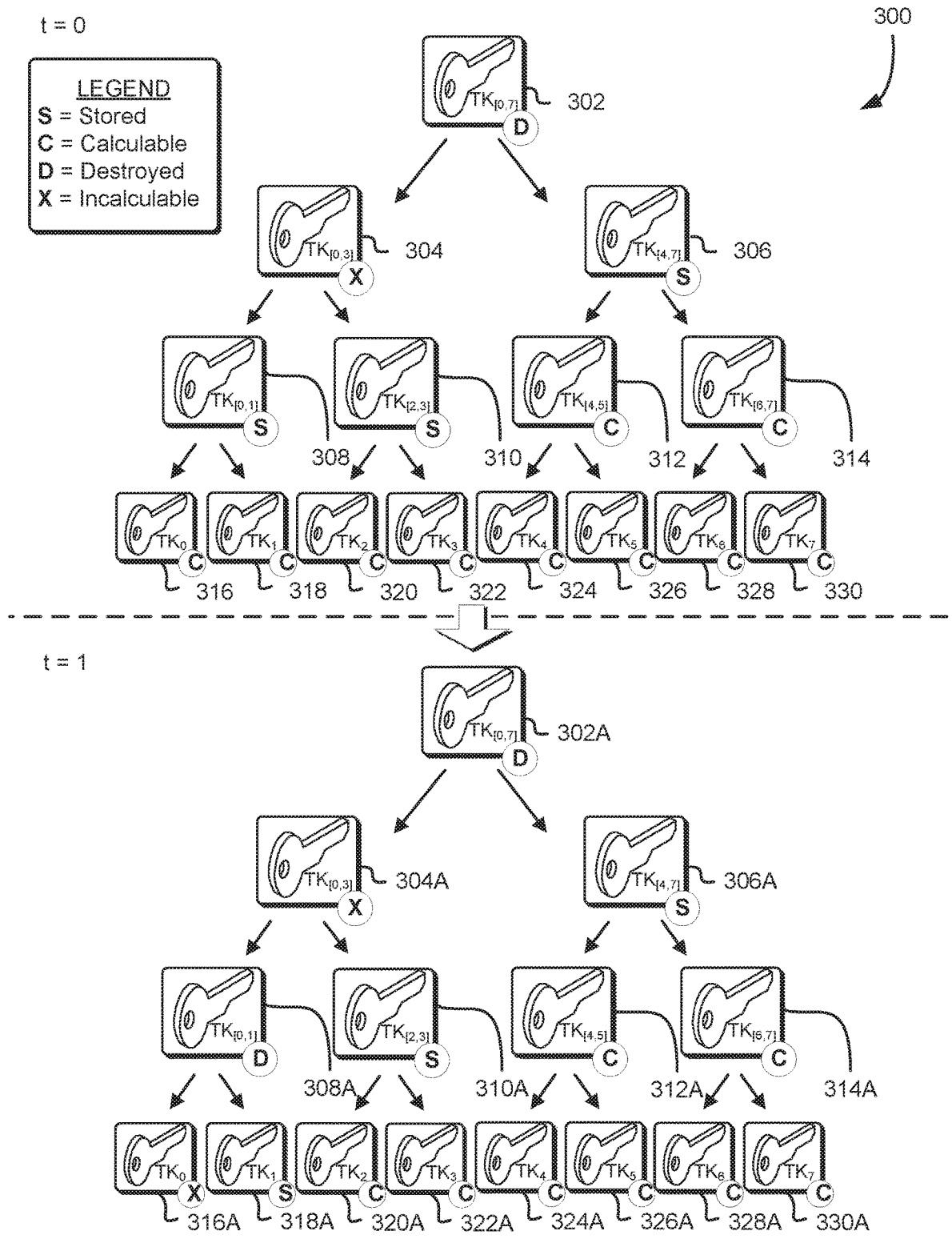
FIG. 3 shows an illustrative example of a cryptographic ratcheting structure, in accordance with at least one embodiment.

FIG. 3 illustrates an example tree structure 300 in which various embodiments can be implemented. The example of FIG. 3 depicts a tree structure 300 comprising the cryptographic ratcheting structure depicted in FIG. 2 at two different times, t=0 and t=1. In an embodiment, the variable t corresponds to a discrete representation of time such that each unit of t represents a predetermined interval of time, and t=0 corresponds to the UNIX epoch, or 00:00:00 UTC, Jan. 1, 1970. The tree structure is referred to as a cryptographic ratcheting structure because different paths in the tree from root to node can be thought of as produced by cryptographic ratcheting with different parameters and/or key derivation functions used to determine how to build a path from root to node. The predetermined interval of time, corresponding to a single unit of t, can be based on various factors. For example, an interval could be determined to be one day, or 24 hours, in which t=1 would represent the time 24 hours after the time determined to be t=0. In an embodiment, FIG. 2 depicts the cryptographic ratcheting structure that each HSM of the network of HSMs 108_1 to 108_N comprises, as described in connection with FIG. 1, at t=initialization, and FIG. 3 depicts the same cryptographic ratcheting structure at t=0 and t=1.

In the upper part of FIG. 3, in an embodiment, at t=0, key 302, which was previously generated and stored, is destroyed, resulting in key 304 becoming incalculable as key 304 was not previously stored, and requires key 302 to be derived/calculated. In an alternative embodiment, key 304 can be calculated and stored, and key 302 can be destroyed, resulting in keys 308 and 310 being calculable such that keys 316 and 318, and keys 320 and 322, are calculable from keys 308 and 310, respectively. Continuing with this embodiment, at t=0, keys 308 and 310 are stored such that keys 316, 318, 320, and 322 are all calculable, or able to be calculated, from keys 308 and 310. Continuing with this embodiment, at t=0, key 306 is stored such that keys 312 and 314 are calculable from key 306, and keys 324 and 326, and keys 328 and 330 are calculable from keys 312 and 314, respectively. Continuing with the embodiment, at t=0, keys 308, 310, and 306 are stored such that all keys corresponding to t=0 and onward (t≥0) are calculable.

In an embodiment, in the lower part of FIG. 3, at t=1, key 308A, which was previously generated and stored, is destroyed, resulting in key 316A becoming incalculable as key 316A was not previously stored, and requires key 308A to be derived/calculated. Continuing with the embodiment, key 318A is stored, and keys 310A and 306A remain stored such that all keys corresponding to t=1 and onward (t≥1) are either stored or calculable. At t=1, only keys corresponding to t=1 and onward can be accessed; the key 316A, corresponding to t=0 (e.g., $TK_0$), is not accessible in any capacity. In an embodiment, for t>1, a similar scheme is utilized such that any key corresponding to a time that has elapsed is inaccessible (e.g., at t=4, appropriate keys are destroyed/stored such that keys corresponding to t<4 are inaccessible). It should be noted that, in various embodiments, any variation of the scheme as described above can be utilized, and any number of keys can be destroyed/stored such that all keys corresponding to times that have elapsed are inaccessible. In an embodiment, an entity denoted as a coordinator performs the deletions and storages as described above. In an embodiment, if a key is stored that can derive both keys corresponding to expired and unexpired times, the coordinator derives and stores one or more keys corresponding to the unexpired times such that all of the keys corresponding to unexpired times can be derived/accessed, and deletes any keys, which can be stored, that correspond to the expired times such that all of the keys corresponding to expired times cannot be derived/accessed. The coordinator can determine the times corresponding to a key based on various metadata the key can comprise, and perform deletions and storages based on the metadata. The coordinator can be the same as the coordinator 114 as described in connection with FIG. 1. In some embodiments, the coordinator is configured with validation logic to ensure that its results are reasonable for the context in which it operates. For instance, in some embodiments, the coordinator initializes the tree structure 300 by generating or otherwise obtaining the root node of the tree 302 and, as part of this initialization, validates that the corresponding time range satisfies certain criteria, such as the left endpoint of the time range being less than the right endpoint, the right endpoint being in the future, the time range having a sufficient portion being in the future, and other criteria.

Figure 4:
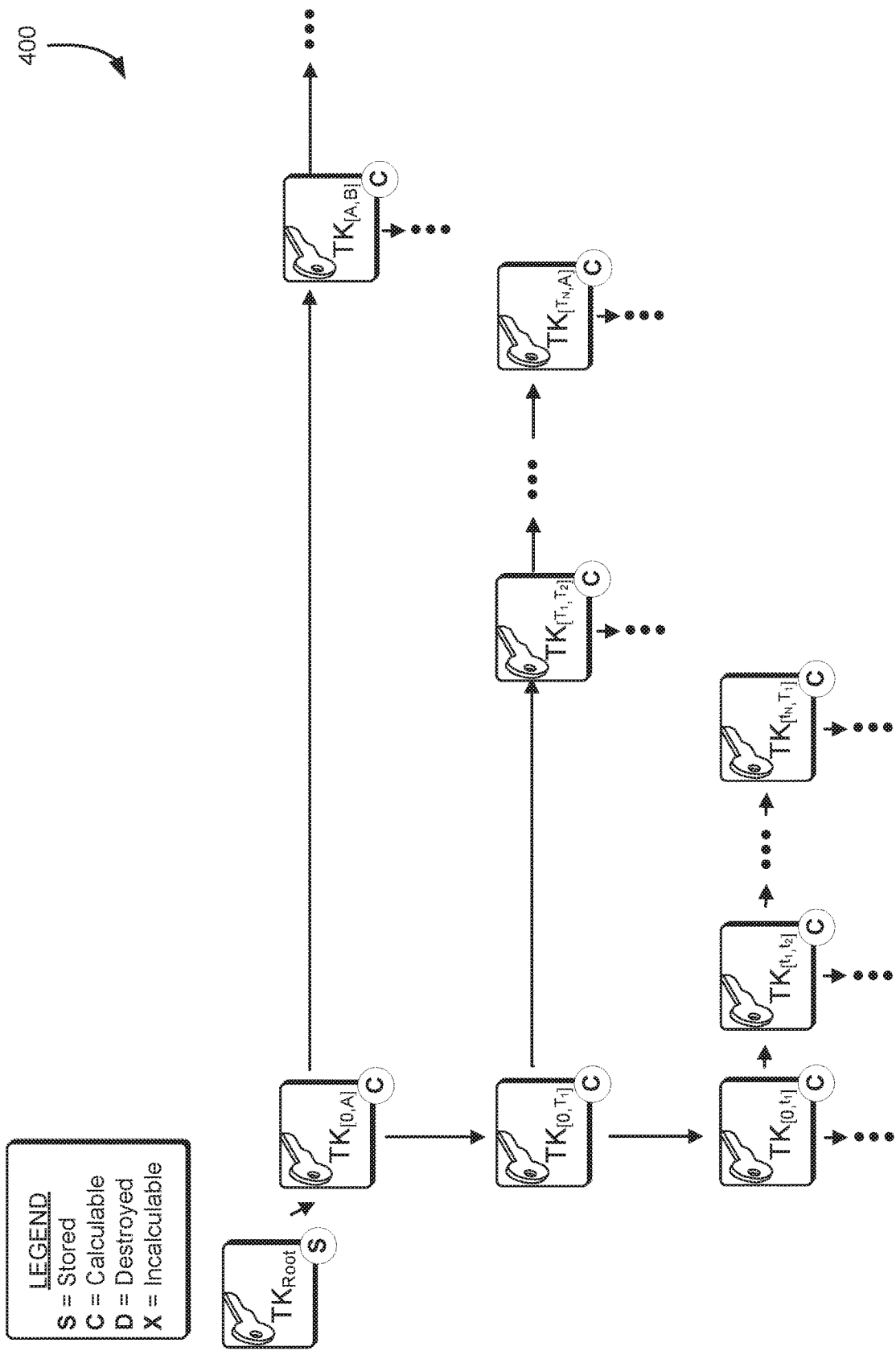
FIG. 4 shows an illustrative example of an alternative cryptographic ratcheting structure, in accordance with at least one embodiment.

FIG. 4 illustrates an example 400 in which various embodiments can be implemented. In an embodiment, FIG. 4 depicts the example 400 comprising a cryptographic ratcheting structure, which can be denoted as a tree, utilizing cryptographic secrets, denoted as timestamp keys ("TK"), corresponding to ranges of time or specific times. For example, $TK_{[0,A]}$ corresponds to a range of time from a time=0 to a time=A, or time interval [0, A], in which the time=0 can represent the UNIX epoch or any chosen starting point, and the time=A can represent any arbitrary point in time after time 0. In an embodiment, the cryptographic ratcheting structure depicted in FIG. 4 is derived from a root key $TK_{Root}$; the root key $TK_{Root}$ can be obtained through one or more processes, such as through a key derivation function, various mathematical functions, from one or more data stores, and/or variations thereof. In an embodiment, FIG. 4 depicts an alternate form of the cryptographic ratcheting structure that each HSM of the network of HSMs 108_1 to 108_N comprises, as described in connection with FIG. 1, at initialization. In the example of FIG. 4, the tree comprises a plurality of levels (e.g., a level illustrated in FIG. 4 being nodes illustrated on the same horizontal line) where each level divides time in a different way and, in particular, each level dividing time at finer and finer granularity the further the level is from the root.

In an embodiment, each level of the cryptographic ratcheting structure comprises keys that are derived from other keys according to a specified time interval. For example, $TK_{[A,B]}$ can be derived from $TK_{[0,A]}$, in which [A, B] can represent the same length of time, or time interval, as [0, A] (i.e., the length of time represented by B−A is equivalent to the length of time represented by A−0). The keys on the first level can be derived up to any arbitrary point (e.g., $TK_{[B,C]}$ can be derived from $TK_{[A,B]}$, in which [B, C] represents the same length of time as [A, B] (or different length), and so on until any arbitrary point, which can be denoted as the end time). As another example, $TK_{[T_1,T_2]}$ can be derived from $TK_{[0,T_1]}$, in which $[T_1, T_2]$ can represent the same length of time as $[0, T_1]$ (i.e., $T_2-T_1$ is equivalent to $T_1-0$). Furthermore, in various embodiments, each level of the cryptographic ratcheting structure is derived beginning with a key that is derived from a key on an above level, with the exception of the first level, which begins with a key that is derived from the root key $TK_{Root}$. For example, key $TK_{[0,T_1]}$, which can be utilized to derive keys $TK_{[T_1,T_2]}$ to $TK_{[T_N,A]}$, can be derived from the key $TK_{[0,A]}$. Additionally, the keys of the cryptographic ratcheting structure can be derived utilizing a key derivation function. The inputs to the key derivation function can correspond to the key being derived (e.g., to derive key $TK_{[0,T_1]}$ from key $TK_{[0,A]}$, the key $TK_{[0,A]}$ and the string "[0, $T_1$]" can be utilized as inputs to a key derivation function to derive the key $TK_{[0,T_1]}$). A key derivation function can be utilized in the cryptographic ratcheting structure such that the original input values cannot be reconstructed from the output value (e.g., keys derived (i.e., ratcheted) from a key cannot be used to reconstruct the original key). Note that other one-way functions (i.e., functions that are computationally impractical to invert) are also considered as being within the scope of the present disclosure.

In an embodiment, each level of the cryptographic ratcheting structure, with the exception of the first level, comprises keys corresponding to a subdivision of an interval that a key on an above level corresponds to; the keys corresponding to the subdivision of the interval can be derived from the timestamp key corresponding to the interval. For example, keys $TK_{[0,T_1]}$ to $TK_{[T_N,A]}$ are derived from key $TK_{[0,A]}$, and correspond to subdivisions of the time interval $[0, A]$. In an example embodiment, time=0 corresponds to the UNIX epoch or 00:00:00 UTC, Jan. 1, 1970, and time=A corresponds to 00:00:00 UTC, January $2^{nd}$, 1970. Continuing with the embodiment, the subdivision interval can be determined to be one hour (e.g., each key of keys $TK_{[0,T_1]}$ to $TK_{[T_N,A]}$ corresponds to a time interval of one hour), in which key $TK_{[0,T_1]}$ corresponds to the time=0 to time=$T_1$, where $T_1$ corresponds to the time 01:00:00 UTC, Jan. 1, 1970, and key $TK_{[T_1,T_2]}$ corresponds to the time=$T_1$ to time=$T_2$, where $T_2$ corresponds to the time 02:00:00 UTC, Jan. 1, 1970, and so on until time=A. Continuing with the example embodiment, the keys are further subdivided on a subsequent level (e.g., the level comprising keys $TK_{[0,t_1]}$ to $TK_{[t_N,T_1]}$, which are derived from key $TK_{[0,T_1]}$). Continuing with the example embodiment, the further subdivision interval can be determined to be 5 minutes (e.g., each key of keys $TK_{[0,t_1]}$ to $TK_{[t_N,T_1]}$ corresponds to a time interval of 5 minutes), in which key $TK_{[0,t_1]}$ corresponds to the time=0 to time=$t_1$, where $t_1$ corresponds to the time 00:05:00 UTC, Jan. 1, 1970, and key $TK_{[t_1,t_2]}$ corresponds to the time=$t_1$ to time=$t_2$, where $t_0$ corresponds to the time 00:10:00 UTC, Jan. 1, 1970, and so on until time=$T_1$.

In an embodiment, the cryptographic ratcheting structure comprises four distinct states for each timestamp key: stored, calculable, destroyed, and incalculable, such as described above. Further information regarding the key states can be found in the description of FIGS. 2 and 3. In an embodiment, the cryptographic ratcheting structure (an example tree structure) depicted in FIG. 4 comprises the root key $TK_{Root}$, which is stored, from which the remaining keys are calculable based off of.

It should be noted that, in various embodiments, the intervals chosen for each level of the cryptographic ratcheting structure, subdivisions for each subsequent level, as well as number of levels, can vary. For example, the interval for the first level of the cryptographic ratcheting structure can be chosen to be one year, in which, assuming time=0 is 00:00:00 UTC, Jan. 1, 1970, time A=00:00:00 UTC, Jan. 1, 1971 and time B=00:00:00 UTC, Jan. 1, 1972 and so on. Continuing with the example, the interval for the second level of the cryptographic ratcheting structure can be chosen to be one month, in which time $T_1$=00:00:00 UTC, Feb. 1, 1970 and time $T_2$=00:00:00 UTC, Mar. 1, 1970 and so on. Further continuing with the example, the interval for the third level of the cryptographic ratcheting structure can be chosen to be one day, in which time $t_1$=00:00:00 UTC, January $2^{nd}$, 1970 and time $t_0$=00:00:00 UTC, January $3^{rd}$, 1970 and so on. Further continuing with the example, other levels can be included that further subdivide the interval for the third level (e.g., the one day interval for the third level can be subdivided into one hour intervals on a fourth level). Other variations are considered as being within the scope of the present disclosure.

In an embodiment, each timestamp key of the timestamp keys within the cryptographic ratcheting structure depicted in FIG. 4 is referenced by the time indicated by the beginning point of the time interval indicated by the timestamp key. For example, if a timestamp key for the time=$T_1$ is required, the key $TK_{[T_1,T_2]}$ can be utilized. In various embodiments, timestamp keys with the same beginning point can all be utilized for the time indicated by the beginning point. For example, if a timestamp key for the time=0 is required, the key $TK_{[0,A]}$, $TK_{[0,T_1]}$, or $TK_{[0,t_1]}$ can be utilized. It should be noted that the timestamp framework can extend intermittent time intervals, with the last time boundary resulting in key destruction. For example, TK[1, 2,4,5] would result in a key that works from time 1 to 2 and 4 to 5 but not between 2 and 4 or any time greater than 5.

Figure 5:
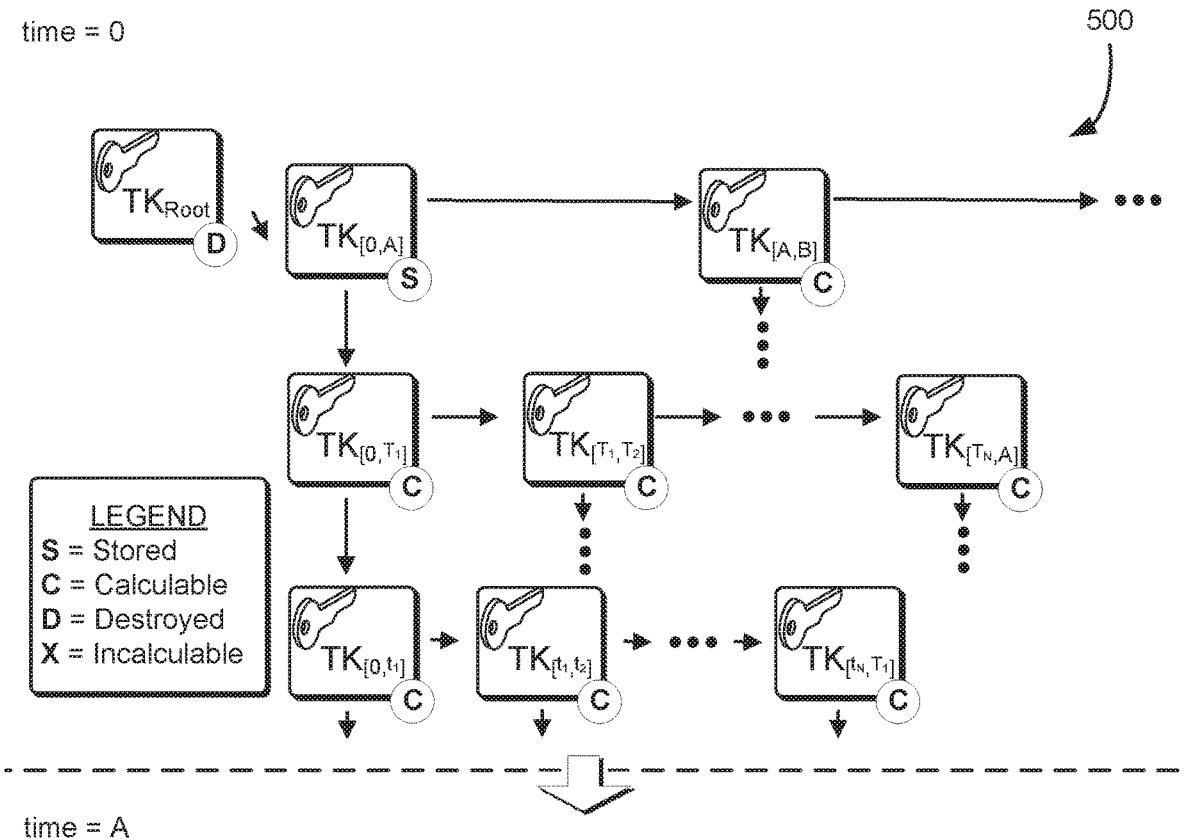
FIG. 5 shows an illustrative example of an alternative cryptographic ratcheting structure, in accordance with at least one embodiment.
Figure 5:
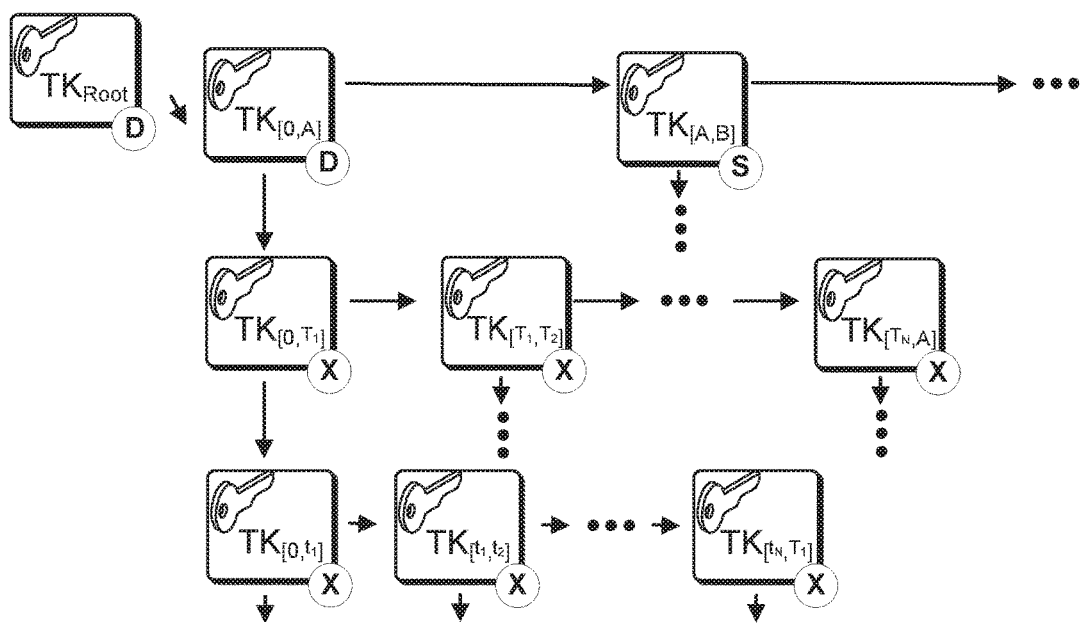

FIG. 5 illustrates an example tree structure 500 in which various embodiments can be implemented. In an embodiment, FIG. 5 depicts an example 500 comprising the cryptographic ratcheting structure depicted in FIG. 4 at two different times, time=0 and time=A. In some examples, the time=0 can represent the UNIX epoch or any chosen starting point, and the time=A can represent any arbitrary point in time after time 0. In an embodiment, FIG. 4 depicts the cryptographic ratcheting structure that each HSM of the network of HSMs 108_1 to 108_N comprises as described in connection with FIG. 1, at time=initialization, and FIG. 5 depicts the same cryptographic ratcheting structure at time=0 and time=A.

In an embodiment, at time=0, key $TK_{[0,A]}$, which was previously calculable, is calculated and stored such that all keys corresponding to time=0 and onward (time≥0) are calculable. Continuing with the embodiment, at time=0, the key $TK_{Root}$, which was previously generated and stored, is destroyed. In an embodiment, at time=A, key TK[A,B], which was previously calculable, is calculated from key $TK_{[0,A]}$, and stored. Continuing with the embodiment, at time=A, key $TK_{[0,A]}$, which was previously generated and stored, is destroyed, resulting in all keys corresponding to the time interval [0, A] becoming incalculable, as those keys require the key $TK_{[0,A]}$ to be derived. Continuing with the embodiment, at time=A, key $TK_{[A,B]}$ is stored such that all keys corresponding to time=A and onward (time≥A) are calculable. In an embodiment, for time≥A, a similar scheme is utilized such that any key corresponding to a time that has elapsed is inaccessible (e.g., at time=B, appropriate keys are destroyed/stored such that keys corresponding to times<B are inaccessible). It should be noted that, in various embodiments, any variation of the scheme as described above can be utilized, and any number of keys can be destroyed/stored such that all keys corresponding to times that have elapsed are inaccessible. In an embodiment, an entity denoted as a coordinator performs the deletions and storages as described above. In an embodiment, if a key is stored that can derive both keys corresponding to expired and unexpired times, the coordinator derives and stores one or more keys corresponding to the unexpired times such that all of the keys corresponding to unexpired times can be derived/accessed, and deletes any keys, which can be stored, that correspond to the expired times such that all of the keys corresponding to expired times cannot be derived/accessed. The coordinator can determine the times corresponding to a key based on various metadata the key can comprise, and perform deletions and storages based on the metadata. The coordinator can be the same as the coordinator 114 as described in connection with FIG. 1.

Figure 6:
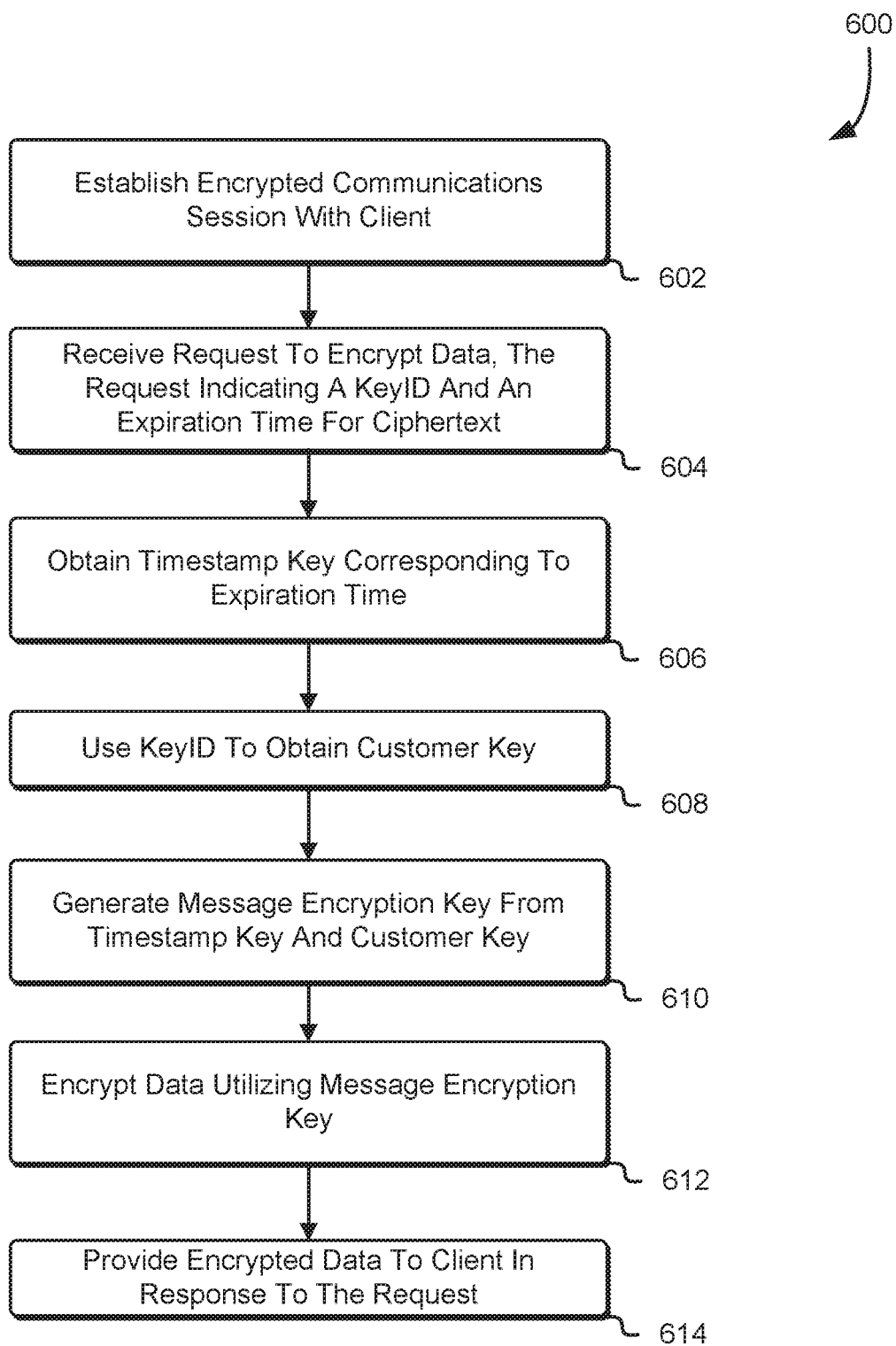
FIG. 6 shows a diagram illustrating a process to encrypt data, in accordance with at least one embodiment.

FIG. 6 illustrates an example of a process 600 that can be performed to obtain, encrypt, and provide data, in accordance with various embodiments. The process 600 can be performed by any suitable system, such as the key management system 106 as described in connection with FIG. 1. The system performing the process 600 can establish 602 an encrypted communications session with a client. In various embodiments, the encrypted communications session can utilize a protocol or application such as TLS (transport layer security), SSL (secure sockets layer), SSH (secure socket shell), VPN (virtual private network), and/or variations thereof. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish the encrypted communications session.

Following the establishment of the encrypted communications session, the system performing the process 600 can receive 604 a request to encrypt data, the request indicating a KeyID and an expiration time for ciphertext. In various embodiments, the request is an API request that is submitted through one or more web service interfaces. Examples of high level API requests can be found in the description of FIG. 1. The client can submit appropriately configured API requests to the system via the encrypted communications session; the API request can be configured as the following example, high-level request: Encrypt(KeyID, Data, Expiration, [AAD]), in which "Data" can specify the data to be encrypted, "KeyID" can specify the key to be utilized to encrypt the data, "Expiration" can specify the expiration time of the data to be encrypted, and "AAD" can specify other additional information.

Upon receipt of the request, the system performing the process 600 can obtain 606 a timestamp key corresponding to the expiration time. The expiration time can be specified by the "Expiration" parameter of the request. The system can obtain the timestamp key through the usage of a cryptographic ratcheting structure such as the cryptographic ratcheting structure each HSM of the network of HSMs 108_1 to 108_N comprises, as described in connection with FIG. 1. Further information regarding the cryptographic ratcheting structure can be found in the description of FIGS. 1-5. For example, the expiration time can correspond to the time 00:00:00 UTC, Jan. 1, 2020, in which the timestamp key corresponding to 00:00:00 UTC, Jan. 1, 2020 can be obtained. In some examples, the expiration time can correspond to a time that is not specified by a timestamp key (e.g., the time interval determined for the timestamp keys does not align with the time indicated by the expiration), in which the timestamp key closest to the expiration time can be utilized, or the system can respond with an error message indicating that no suitable timestamp key can be found. In various examples, the expiration time can correspond to a time that has already elapsed, in which the system can respond with an error message indicating that the expiration time has already passed.

In various embodiments, the system can obtain the timestamp key by interfacing with an HSM of the network of HSMs 108_1 to 108_N, utilizing the cryptographic ratcheting structure the HSM comprises to derive the appropriate timestamp key, and retrieving the derived timestamp key. In some examples, the timestamp key can already have been derived and stored as part of the cryptographic ratcheting structure each HSM of the network of HSMs 108_1 to 108_N comprises, in which the timestamp key can simply be retrieved from any HSM of the network of HSMs 108_1 to 108_N.

The system performing the process 600 can use 608 the KeyID to obtain a customer key (which may also be referred to as a master key). The KeyID can specify the customer key, and can be a data object such as a sequence of bits that denotes the specific customer key. In some examples, the customer key can be stored in one or more data stores, in which the system can retrieve the customer key through interfacing with the one or more data stores. In an embodiment, the customer key is stored in encrypted form in one or more data stores. Continuing with the embodiment, the system interfaces with the one or more data stores and retrieves the customer key in encrypted form, and decrypts the customer key utilizing a key stored locally on the system, which can be denoted as a fleet key.

The system performing the process 600 can generate 610 a message encryption key from the timestamp key and the customer key. In some examples, the message encryption key can be generated as the result of a derivation from a key derivation function, which can utilize the timestamp key and the customer key as inputs. In some examples, the key derivation function can be hash-based message authentication code ("HMAC") based, such as the HMAC based key derivation function described in RFC (Request For Comments) 5869. For example, a HMAC key derivation function can be utilized in the following manner: Message Encryption Key=HMAC KDF(Timestamp Key, Customer Key), to generate the message encryption key. In this way, the message encryption key is cryptographically protected by the customer key and the timestamp key. Note, however, that different ways of cryptographically protecting the message encryption key using one or both of the customer key and timestamp key are considered as being within the scope of the present disclosure. For example, in some embodiments, the message encryption key is generated (e.g., randomly) and encrypted by the timestamp key, the customer key, or both to result in ciphertext such that one or both of the timestamp key and the customer key are requisite for obtaining the message encryption key from the ciphertext. In another embodiment, the message encryption key and one of the customer key or timestamp key are input into a key derivation function and output of the key derivation function is encrypted with the other of the customer key and the timestamp key. Other ways of cryptographically protecting the message encryption key such that the timestamp key is requisite for obtaining a plaintext version of the message encryption key are within the scope of the present disclosure.

Further information regarding the key derivation function can be found in the description of FIG. 1. Following the generation of the message encryption key, the system performing the process 600 can encrypt 612 data utilizing the message encryption key. In an embodiment, the data to be encrypted is the data specified by "Data" of the API request. In various examples, the data to be encrypted can be in plaintext in the "Data" of the API request. In an alternative embodiment, the data to be encrypted is stored on one or more data stores, in which the "Data" of the API request is an identifier such as a uniform resource identifier that specifies the location of the data to be encrypted; the system can retrieve the data by interfacing with the one or more data stores, and locating the data utilizing the "Data" of the API request.

The data to be encrypted can be encrypted utilizing the message encryption key. In some examples, encryption can include one or more of the following cryptographic processes: encryption, digital signatures, or otherwise generating data that provides secrecy and/or integrity of the data. The encryption of the data can also be done using a cryptographic cipher that uses the message encryption key as input. Additionally, the message encryption key may be symmetric key of a private key cryptosystem, also known as symmetric key algorithms. Examples of cryptographic ciphers and symmetric key algorithms can be found in the description of FIG. 1. The system can provide 614 the encrypted data to the client in response to the request. The encrypted data can be provided to the client through one or more web service interfaces, and can utilize the encrypted communications session as described in the preceding paragraphs.

Figure 7:
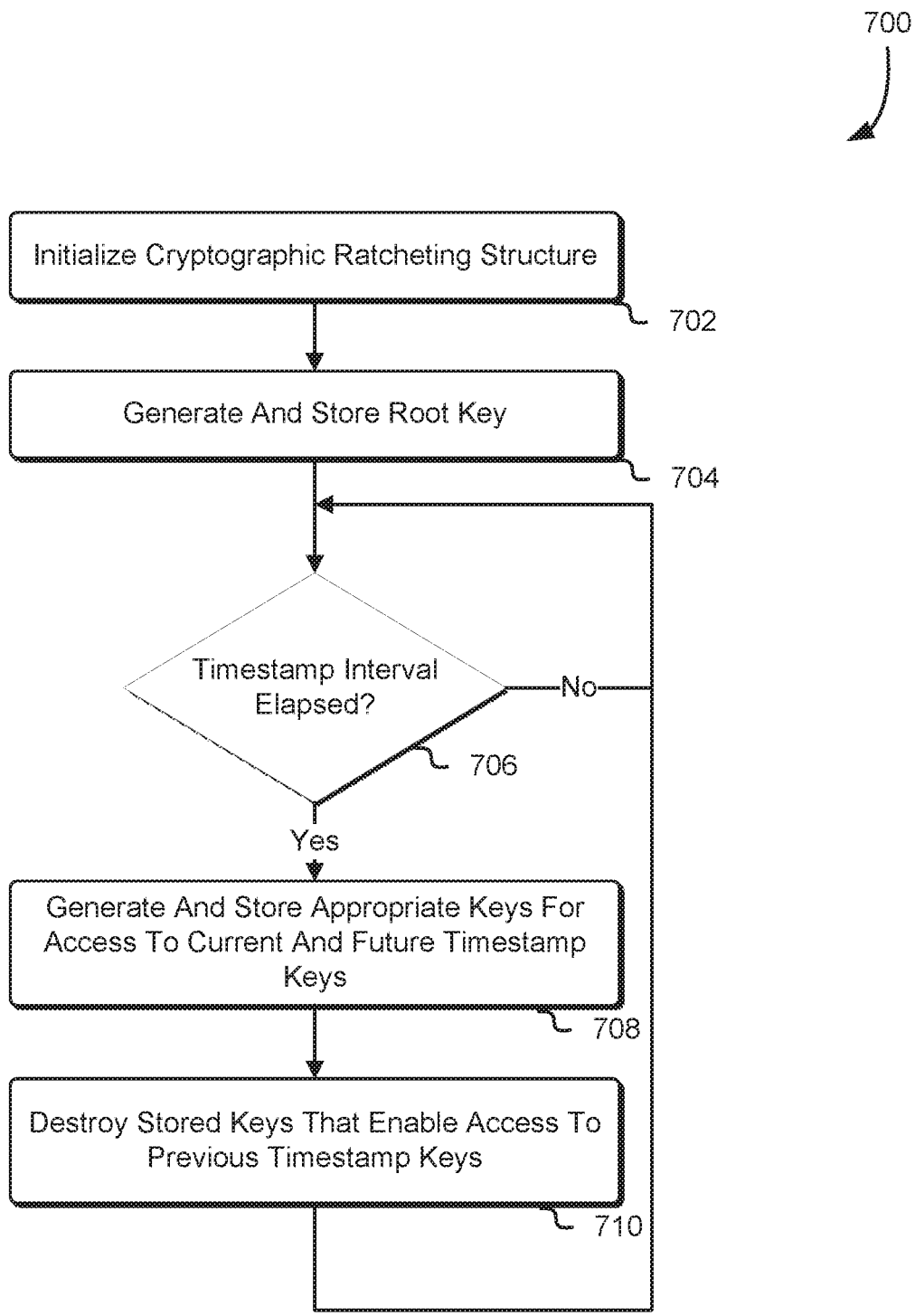
FIG. 7 shows a diagram illustrating a process to maintain and expire cryptographic keys, in accordance with at least one embodiment.

FIG. 7 illustrates an example of a process 700 that can be performed to maintain a cryptographic ratcheting structure, which can be denoted as a tree, in accordance with various embodiments. The process 700 can be performed by any suitable system, such as the key management system 106 as described in connection with FIG. 1. The system performing the process 700 can initialize 702 a cryptographic ratcheting structure. In some examples, the cryptographic ratcheting structure can be the cryptographic ratcheting structure each HSM of the network of HSMs 108_1 to 108_N comprises as described in connection with FIG. 1. In various embodiments, the cryptographic ratcheting structure can be any variation of the cryptographic ratcheting structures depicted in FIGS. 2-5, and can include any combination of the structures. For example, the cryptographic ratcheting structure can comprise a horizontal top level like the structure depicted in FIG. 4 comprises, in which each key on the horizontal top level can be utilized to derive a structure like the structure depicted in FIG. 2.

In various embodiments, the system can represent time through the usage of a discrete variable, t, in which the variable t corresponds to a discrete representation of time such that each unit of t represents a predetermined interval of time, and t=0 corresponds to the UNIX epoch, or 00:00:00 UTC, Jan. 1, 1970. The predetermined interval of time, corresponding to a single unit of t, can be based on various factors. For example, an interval could be determined to be one day, or 24 hours, in which t=1 would represent the time 24 hours after the time determined to be t=0. The time can be monitored by the system through an internal system clock, one or more timestamp services, and/or variations thereof. The system can initialize the cryptographic ratcheting structure by determining a starting time (e.g., what time corresponds to t=0) a timestamp interval (e.g., how much time one unit of t represents), and an ending time (e.g., the maximum value of t). The system can initialize the cryptographic ratcheting structure in each HSM of the network of HSMs 108_1 to 108_N. In an alternative embodiment, the system initializes the cryptographic ratcheting structure in a single HSM of the network of HSMs 108_1 to 108_N, and runs a consensus protocol such that each HSM of the network of HSMs 108_1 to 108_N comprises the initialized cryptographic ratcheting structure.

The system performing the process 700 can generate 704 and store a root key. In some examples, the root key can correspond the range of time from the starting time to the ending time. The system can generate the root key through one or more processes, such as through a key derivation function, various mathematical functions, from one or more data stores, and/or variations thereof. The system can store the root key as part of the cryptographic ratcheting structure each HSM of the network of HSMs 108_1 to 108_N comprises. The system can run a consensus protocol such that each HSM of the network of HSMs 108_1 to 108_N comprises the stored root key. In an embodiment, the system stores the root key in as part of the cryptographic ratcheting structure a single HSM of the network of HSMs 108_1 to 108_N comprises, and runs a consensus protocol such that each HSM of the network of HSMs 108_1 to 108_N comprises the same cryptographic ratcheting structure with the root key stored.

The system can determine if a timestamp interval 706 has elapsed. In some examples, the timestamp interval elapsing can be denoted as a "time based trigger," in which the system can be triggered in response to the timestamp interval elapsing. The system can continuously monitor time, beginning from the determined starting time, until the determined timestamp interval has elapsed. The system can record the time corresponding to one elapsed timestamp interval after the determined starting time, and continuously monitor time until another timestamp interval has elapsed from the previously recorded time, and record that time as the new starting time. The system can utilize this process of determining one timestamp interval has elapsed from a determined starting point, storing the time corresponding to one elapsed timestamp interval, and utilizing the stored time as a new starting point to determine if a subsequent timestamp interval has elapsed continuously until a determined end time. If a timestamp interval has not elapsed, the system can continue with the process described previously. In various embodiments, the timestamp interval can correspond to the timestamp interval determined at the initialization of the cryptographic ratcheting structure. In alternative embodiments, the timestamp interval can correspond to an interval that can comprise multiple intervals of the timestamp interval determined at the initialization of the cryptographic ratcheting structure. For example, a given cryptographic ratcheting structure can be initialized with a chosen timestamp interval of one hour, in which the timestamp interval monitored in 706 can be one hour, or any number of hours.

If a timestamp interval has elapsed, the system can generate 708 and store appropriate keys for access to current and future timestamp keys. The system can generate and store the appropriate timestamp keys such that all current and future timestamp keys can be accessed or derived. For example, at t=1, the system can generate and store the appropriate timestamp keys such that the timestamp keys corresponding to times t≥1 can be derived and/or accessed. In some embodiments, the cryptographic ratcheting structure comprises various levels, in which each timestamp key on each level denotes a range of timestamp keys on a lower level. For example, a level of the cryptographic ratcheting structure can comprise a timestamp key corresponding to the range t=0 to t=3; the level below that level can comprise timestamp keys corresponding to the ranges t=0 to t=1, and t=2 to t=3, which are derived from the timestamp key on the above level. Continuing with the example, the level below can comprise timestamp keys for t=0, t=1, t=2, and t=3, which are derived from the timestamp keys corresponding to the ranges t=0 to t=1, and t=2 to t=3. In an embodiment, the system generates appropriate timestamp keys by deriving them from keys on previous levels of the cryptographic ratcheting structure through a key derivation function. The system can derive the appropriate timestamp keys utilizing the cryptographic ratcheting structure a single HSM of the network of HSMs 108_1 to 108_N comprises, store the derived timestamp keys in the HSM, and run a consensus protocol such that each HSM of the network of HSMs 108_1 to 108_N comprises the same cryptographic ratcheting structure with the newly derived timestamp keys stored.

The system can destroy 710 stored keys that enable access to previous timestamp keys. In various embodiments, the system can destroy the appropriate timestamp keys such that any timestamp key corresponding to a time that has elapsed is inaccessible. For example, at t=4, the system can destroy any stored keys that enable access to timestamp keys corresponding to times t<4. In various embodiments, an auxiliary system with a separate time keeping system can monitor the system and the keys the system has determined appropriate for destruction. The auxiliary system can determine if errors have occurred in the system and mitigate the errors. For example, the auxiliary system can store keys that are destroyed, and provide them if it is determined that the keys were destroyed in error. In some examples, if keys are determined to be mistakenly slated to be destroyed, but have not yet been destroyed, the auxiliary system can notify the system performing the process 700 of the error. Additionally, in some examples, the auxiliary system can store keys that can be utilized to derive keys that have been destroyed, and derive the keys if it is determined that the keys were mistakenly destroyed. For example, the system performing the process 700 can undergo a malfunction in which the time monitored by the system becomes incorrect. Continuing with the example, the auxiliary system can be continuously monitoring the system and storing various appropriate keys. Further continuing with the example, the system can mistakenly determine an incorrect number of timestamp intervals have elapsed, and incorrectly destroy one or more stored timestamp keys. Continuing with the example, the auxiliary system can determine that the system has experienced an error, provide the system with the correct time keeping information such that the system can mitigate the error, and provide the system with the previously incorrectly destroyed timestamp keys such that the system can continue operation correctly. In some examples, the auxiliary system can be denoted as a subsystem of the system performing the process 700, and can utilize a second time source such as an external clock, one or more timestamp services, and/or variations thereof. In an embodiment, the auxiliary system stores keys that are destroyed for a specified interval of time such that during the interval of time, the destroyed keys can be recovered; however, in an embodiment, after the interval, the keys are destroyed from the auxiliary system.

The system can destroy the appropriate timestamp keys through various methods, such as by rewriting the storage space in which the key was stored; the system can destroy the appropriate timestamp keys such that the destroyed timestamp keys are securely erased and not recoverable in any capacity. The system can destroy the appropriate timestamp keys within the cryptographic ratcheting structure a single HSM of the network of HSMs 108_1 to 108_N comprises, and run a consensus protocol such that each HSM of the network of HSMs 108_1 to 108_N comprises the same cryptographic ratcheting structure with the appropriate timestamp keys destroyed. The system can continuously monitor time and determine if a timestamp interval 706 has elapsed and continue with 708-710, until a determined ending point. Further information regarding the tree and maintenance of the tree can be found in the descriptions of FIGS. 1-5.

Figure 8:
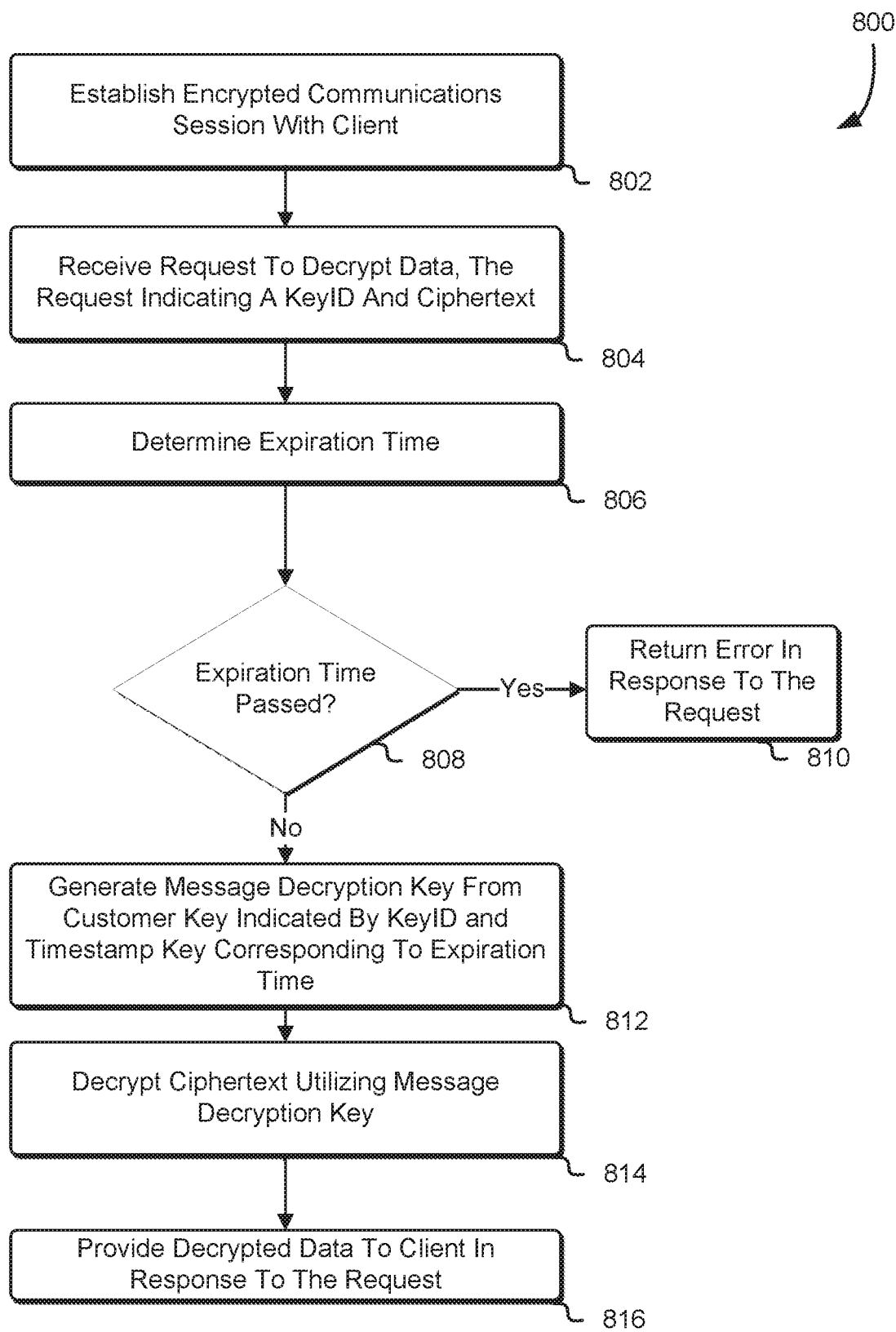
FIG. 8 shows a diagram illustrating a process to decrypt data, in accordance with at least one embodiment.

FIG. 8 illustrates an example of a process 800 that can be performed to decrypt data, in accordance with various embodiments. The process 800 can be performed by any suitable system, such as the key management system 106 as described in connection with FIG. 1. The system performing the process 800 can 802 establish an encrypted communications session with a client. In various embodiments, the encrypted communications session can utilize a protocol or application such as TLS (transport layer security), SSL (secure sockets layer), SSH (secure socket shell), VPN (virtual private network), and/or variations thereof. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish the encrypted communications session.

Following the establishment of the encrypted communications session, the system performing the process 800 can receive 804 a request to encrypt data, the request indicating a KeyID and ciphertext. In various embodiments, the request is an API request that is submitted through one or more web service interfaces. Examples of high level API requests can be found in the description of FIG. 1. The client can submit appropriately configured API requests to the system via the encrypted communications session; the API request can be configured as the following example, high-level request: Decrypt(KeyID, Ciphertext, [AAD]), in which "KeyID" can specify a key utilized to generate the ciphertext, "Ciphertext" can specify the ciphertext, and "AAD" can specify other additional information.

Upon receipt of the request, the system performing the process 800 can determine 806 the expiration time. In various embodiments, the expiration time refers to the expiration time of the ciphertext, in which after the expiration time has passed, the ciphertext is not able to be decrypted, or is undecryptable. In some examples, the system can determine the expiration time through various forms of metadata, which can also be submitted to the system from the client. The metadata can be submitted as part of the "AAD." Additionally, the system can analyze the ciphertext, "KeyID," and/or variations thereof, to determine the expiration time. The system can then determine if the expiration time 808 has passed. In some examples, the expiration time has passed if the time indicated by the expiration time has already occurred (e.g., on the given day Jan. 1, 2020, an expiration time of Jan. 1, 2019 will be determined to have passed). If the expiration time has passed, the system can return 810 an error in response to the request. The system can return an error message to the client indicating that the expiration time has passed for the specified ciphertext.

If the expiration time has not passed, the system performing the process 800 can generate 812 a message decryption key from the customer key indicated by the KeyID and timestamp key corresponding to the expiration time. The system can use the KeyID to obtain the customer key (which may also be referred to as a master key). The KeyID can be an identifier that specifies the customer key, and can be a data object such as a sequence of bits that denotes the specific customer key. In some examples, the customer key can be stored in one or more data stores, in which the system can retrieve the customer key through interfacing with the one or more data stores. In an embodiment, the customer key is stored in encrypted form in one or more data stores. Continuing with the embodiment, the system interfaces with the one or more data stores and retrieves the customer key in encrypted form, and decrypts the customer key on one or more HSMs the system comprises utilizing a key stored locally on the system, which can be denoted as a fleet key and may additionally be stored on the one or more HSMs. Thus, continuing with the embodiment, the customer key only exists in plaintext form in one or more HSMs the system comprises.

The system can obtain a timestamp key corresponding to the expiration time. The expiration time can be specified by the "Expiration" parameter of the request. The system can obtain the timestamp key through the usage of a cryptographic ratcheting structure such as the cryptographic ratcheting structure each HSM of the network of HSMs 108_1 to 108_N comprises, as described in connection with FIG. 1. Further information regarding the cryptographic ratcheting structure can be found in the description of FIGS. 1-5. For example, the expiration time can correspond to the time 00:00:00 UTC, Jan. 1, 2020, in which the timestamp key corresponding to 00:00:00 UTC, Jan. 1, 2020 can be obtained. In some examples, the expiration time can correspond to a time that is not specified by a timestamp key (e.g., the time interval determined for the timestamp keys does not align with the time indicated by the expiration), in which the timestamp key closest to the expiration time can be utilized, or the system can respond with an error message indicating that no suitable timestamp key can be found. In various examples, the expiration time can correspond to a time that has already elapsed, in which the system can respond with an error message indicating that the expiration time has already passed.

In various embodiments, the system can obtain the timestamp key by interfacing with an HSM of the network of HSMs 108_1 to 108_N, utilizing the cryptographic ratcheting structure the HSM comprises to derive the appropriate timestamp key, and retrieving the derived timestamp key. In some examples, the timestamp key can already have been derived and stored as part of the cryptographic ratcheting structure each HSM of the network of HSMs 108_1 to 108_N comprises, in which the timestamp key can simply be retrieved from any HSM of the network of HSMs 108_1 to 108_N.

The system performing the process 800 can generate the message decryption key from the timestamp key and the customer key. In some examples, the message decryption key can be generated as the result of a derivation from a key derivation function, which can utilize the timestamp key and the customer key as inputs. In some examples, the key derivation function can be hash-based message authentication code ("HMAC") based, such as the HMAC based key derivation function described in RFC (Request For Comments) 5869. For example, a HMAC key derivation function can be utilized in the following manner: Message Decryption Key=HMAC KDF(Timestamp Key, Customer Key), to generate the message decryption key. Following the generation of the message decryption key, the system performing the process 800 can decrypt 814 the ciphertext utilizing the message decryption key.

The ciphertext can be decrypted utilizing the message decryption key. In some examples, decryption can be done using a cryptographic cipher that uses the message decryption key as input. Additionally, the message decryption key may be symmetric key of a private key cryptosystem, also known as symmetric key algorithms. Examples of cryptographic ciphers and symmetric key algorithms can be found in the description of FIG. 1. The system can provide 816 the decrypted data to the client in response to the request. The decrypted data can be provided to the client through one or more web service interfaces, and can utilize the encrypted communications session as described in the preceding paragraphs.

Figure 9:
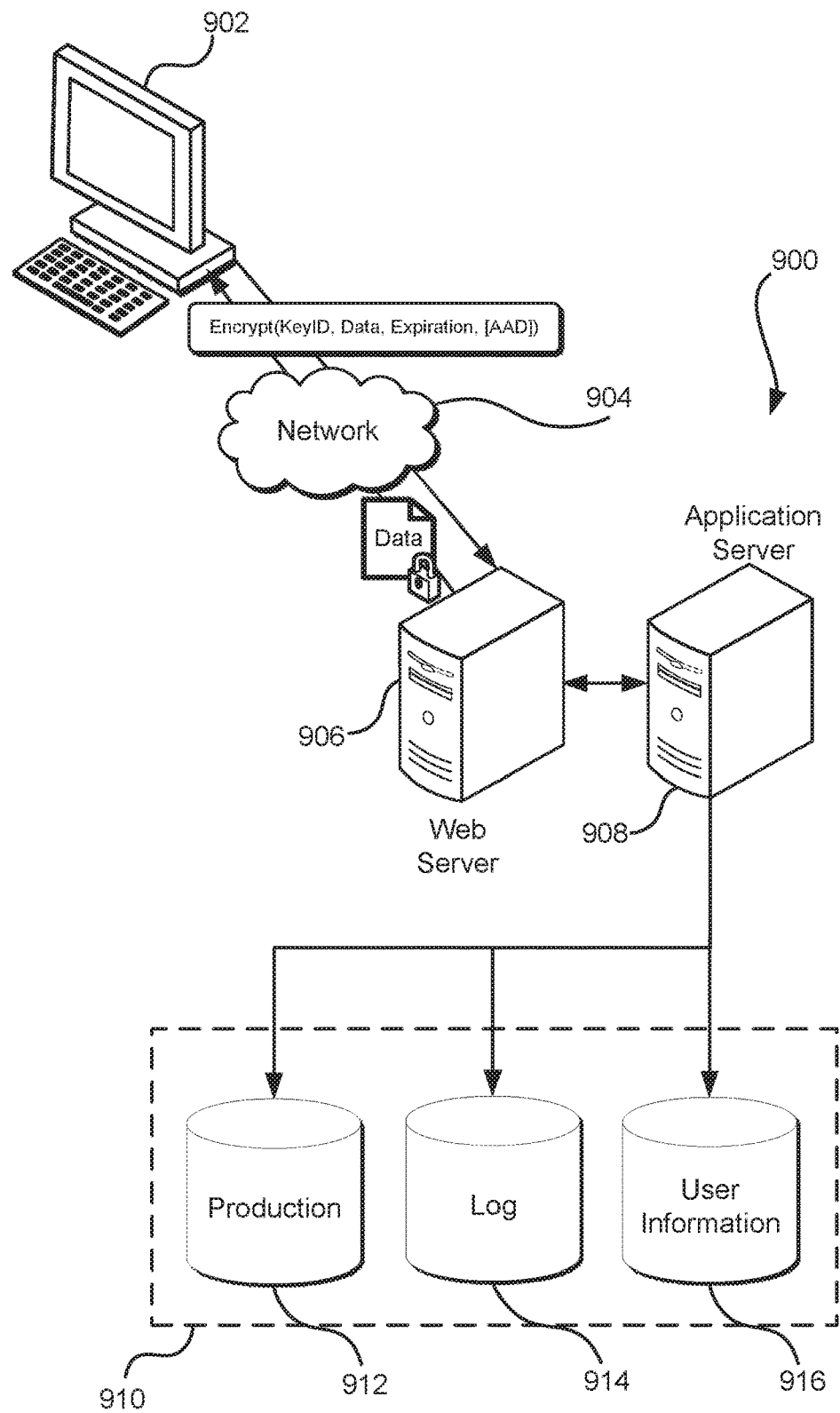
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

Embodiments of the present disclosure can be described in view of the following clauses:

1. A computer-implemented method, comprising:
   obtaining, at a key management system, an application programming interface request to encrypt a plaintext, the application programming interface request comprising an identifier of a cryptographic key managed by the key management system and indicating an expiration;
   obtaining a first cryptographic key that corresponds to the identifier;
   deriving a second cryptographic key by performing a plurality of successive key derivation operations to traverse a path in a tree structure, wherein nodes in the tree structure represent time intervals and wherein the second cryptographic key corresponds to a time interval that matches the expiration thereby causing the second cryptographic key to expire at a time matching the expiration due to enforcement of the expiration by the key management system by destruction of keys usable to derive the second cryptographic key;
   deriving a third cryptographic key based on the first cryptographic key and the second cryptographic key;

using the third cryptographic key to encrypt the plaintext to generate a ciphertext; and providing the ciphertext in response to the application programming interface request.

2. The computer-implemented method of clause 1, further comprising enforcing a second expiration of a fourth cryptographic key of the tree structure by at least destroying cryptographic material in the tree structure from which the fourth cryptographic key is derivable.

3. The computer-implemented method of clause 1 or 2, wherein deriving the second cryptographic key comprises performing a series of key derivations that traverses the tree structure until reaching a leaf node of the tree structure.

4. The computer-implemented method any of clauses 1-3, wherein the tree structure comprises:

a first level comprising nodes that correspond to time ranges; and a second level comprising a branch with nodes computable by cryptographically ratcheting a node from the first level, the nodes of the branch corresponding to cryptographic keys.

5. A system, comprising:

one or more processors; and memory that stores computer-executable instructions executable to cause the system to:

obtain a request to perform a cryptographic operation;

obtain first cryptographic material that corresponds to a plurality of expiration times;

derive, based on the first cryptographic material, second cryptographic material that corresponds to an expiration time of the plurality of expiration times;

perform the cryptographic operation based on the second cryptographic material to obtain a result of the cryptographic operation that expires in accordance with the second expiration time; and provide the result of the cryptographic operation to respond to the request.

6. The system of clause 5, wherein the second cryptographic material is a symmetric cryptographic key.

7. The system of clause 5 or 6, wherein the ciphertext expires in accordance with the second expiration time as a result of a set of nodes in a tree structure, including a node corresponding to the first cryptographic material, being scheduled to be destroyed to prevent the second cryptographic key from being derivable.

8. The system of any of clauses 5-7, wherein the instructions cause the system to derive the second cryptographic material by performing successive derivations from the first cryptographic material, the successive derivations corresponding to respective overlapping time intervals.

9. The system of any of clauses 5-8, wherein the instructions cause the system to derive the second cryptographic material by cryptographically ratcheting third cryptographic material that is derived from the first cryptographic material to traverse multiple non-overlapping time intervals.

10. The system of any of clauses 5-9, wherein the instructions cause the system to perform the cryptographic operation based on the second cryptographic material by at least inputting the second cryptographic material and third cryptographic material into a cryptographic algorithm to generate a cryptographic key to be used to perform the cryptographic operation.

11. The system of clause 10, wherein the third cryptographic material is a cryptographic key selected from a plurality of cryptographic keys as a result of being associated with an entity of a plurality of entities for the plurality of cryptographic keys are managed by the system.

12. The system of any of clauses 5-11, wherein the instructions that cause the system to perform the cryptographic operation based on the second cryptographic material further cause the system to:

obtain third cryptographic material;

obtain fourth cryptographic material that is cryptographically protected by the second cryptographic material and the third cryptographic material; and perform the cryptographic operation using the fourth cryptographic material.

13. A non-transitory computer-readable storage medium storing thereon executable instructions that, as a result of being executed by one or more processors of a computer system, cause the computer system to at least:

determine first cryptographic material corresponding to a time range that includes an expiration;

perform a set of cryptographic derivations based on the first cryptographic material to obtain second cryptographic material that matches the expiration; and use the second cryptographic material to generate a result of a cryptographic operation that expires at a time corresponding to the expiration.

14. The non-transitory computer-readable storage medium of clause 13, wherein the cryptographic operation is encryption to produce a ciphertext and the second cryptographic material is scheduled to be destroyed at a time corresponding to the expiration.

15. The non-transitory computer-readable storage medium of any of clauses 13-14, wherein the set of cryptographic derivations comprises traversing a branch of a tree structure in which the first cryptographic material corresponds to a node and multiple nodes derived from the node divide the time range into at least two sub-ranges, one of which comprising the expiration.

16. The non-transitory computer-readable storage medium of any of clauses 13-15, wherein the set of cryptographic derivations results in derivation of multiple instances of cryptographic material corresponding to successive expirations until reaching the expiration.

17. The non-transitory computer-readable storage medium of any of clauses 13-16, wherein the instructions further cause the computer system to:

obtain a request to decrypt the ciphertext; and deny the request as a result of the second cryptographic material having expired.

18. The non-transitory computer-readable storage medium of any of clauses 13-17, wherein the set of cryptographic utilize a key derivation function with respective inputs determined according to how to traverse a tree to obtain the second cryptographic material.

19. The non-transitory computer-readable storage medium of any of clauses 13-18, wherein the instructions cause the computer system to determine the expiration based on information in an application programming interface request to perform the cryptographic operation.

20. The non-transitory computer-readable storage medium of any of clauses 13-19, wherein the instructions further cause the computer system to destroy all cryptographic material available to the computer system usable to derive the second cryptographic material at a time corresponding to the expiration.

21. A computer-implemented method, comprising:
detecting, at a key management system, a time-based trigger corresponding to a first expiration of a first set of cryptographic keys;
as a result of detection of the time-based trigger, performing a set of operations to expire the first set of cryptographic keys, the set of operations comprising:
calculating a first cryptographic key in a tree structure that is usable to derive a second set of cryptographic keys that expire after the first expiration;
storing the first cryptographic key; and
destroying a second cryptographic key in the tree structure that is usable to derive a third cryptographic key in the first set of cryptographic keys to cause the key management system to lack an ability to derive the third cryptographic key;
obtaining, at the key management system, a request to encrypt data, the request indicating a second expiration;
using the first cryptographic key to derive a fourth cryptographic key corresponding to the second expiration; and
using the fourth cryptographic key to generate ciphertext in response to the request to cause the ciphertext to be undecryptable after the second expiration.

22. The computer-implemented method of clause 21, wherein, in the tree structure, the second cryptographic key corresponds to a first time range, the first cryptographic key is calculated from the second cryptographic key and corresponds to a second time range within the first time range.

23. The computer-implemented method of clause 21 or 22, wherein the second set of cryptographic keys comprises a plurality of cryptographic keys calculable by cryptographic ratcheting the first cryptographic key and wherein the key management system expires the first set of cryptographic keys without ever having stored at least a subset of the first set of cryptographic keys.

24. The computer-implemented method of any of clauses 21-13, wherein the ciphertext is caused to be undecryptable as a result of the key management system being unable to derive the second cryptographic key after the second expiration.

25. A system, comprising:
one or more processors; and
memory that stores computer-executable instructions executable to cause the system to:
store cryptographic material that is sufficient to derive, according to a tree structure, a plurality of cryptographic keys with respective expirations; and
update the stored cryptographic material to prevent the system from being able to derive cryptographic keys of the plurality of cryptographic keys that have expired while still being able to derive, using the tree structure, cryptographic keys of the plurality of cryptographic keys that have yet to expire.

26. The system of clause 25, wherein the tree structure comprises:
a parent node corresponding to a time interval such that the parent node is usable to derive cryptographic keys that expire within the time interval;
a first child node derived from the parent node and corresponding to a first sub-interval within the time interval such that the first child node is usable to derive cryptographic keys that expire within the first sub-interval; and
a second child node derived from the parent node and corresponding to a second sub-interval within the time interval such that the second child node is usable to derive cryptographic keys that expire within the second sub-interval.

27. The system of clause 25 or 26, wherein the tree structure comprises a plurality of levels, the plurality of levels individually comprising nodes calculable by cryptographic ratcheting.

28. The system of any of clauses 25-27, wherein the plurality of cryptographic keys are symmetric cryptographic keys.

29. The system of any of clauses 25-28, wherein the instructions are executable to cause system to update the stored cryptographic material based on a time-based trigger.

30. The system of any of clauses 25-29, wherein the instructions are executable to update the stored cryptographic material by at least:
deriving second cryptographic material from the stored cryptographic material;
storing the second cryptographic material; and
destroying a portion of the stored cryptographic material to prevent the system from being able to derive cryptographic keys that have expired.

31. The system of any of clauses 25-30, wherein, after updating the stored cryptographic material, the system stores fewer than all of the cryptographic keys that have yet to expire.

32. The system of any of clauses 25-31, wherein:
the system operates according to a first time source;
the system comprises a subsystem that operates according to a second time source; and
for a limited time after updating the stored cryptographic material, the subsystem is capable of deriving cryptographic keys of the plurality of cryptographic keys that have expired.

33. A non-transitory computer-readable storage medium storing thereon executable instructions that, as a result of being executed by one or more processors of a computer system, cause the computer system to at least:
detect a time-based trigger; and
in response to detection of the time-based trigger, update stored cryptographic material by at least deriving first cryptographic material and destroying second cryptographic material, the first cryptographic material and the second cryptographic material being derived from a common node in a tree structure, wherein the first cryptographic material corresponds to a set of unexpired keys and the second cryptographic material corresponds to a set of expired keys.

34. The non-transitory computer-readable storage medium of clause 33, wherein the trigger is reaching a time corresponding to expiration of at least one key.

35. The non-transitory computer-readable storage medium of clause 33 or 34, wherein the instructions executable to cause the system to update the material are executable to cause the system to instruct a hardware security module to perform said deriving and said destroying.

36. The non-transitory computer-readable storage medium of any of clauses 33-35, wherein the second cryptographic material corresponds to a time interval and destruction of the second cryptographic material prevents an ability to derive any cryptographic keys with expirations occurring in the time interval.

37. The non-transitory computer-readable storage medium of any of clauses 33-36, wherein the instructions executable to cause the computer system to derive the first cryptographic material are executable to cause the computer system to obtain third cryptographic material in the tree structure and cryptographically ratchet the third cryptographic material to obtain the first cryptographic material.
38. The non-transitory computer-readable storage medium of any of clauses 33-37, wherein the instructions executable to cause the computer system to update the stored cryptographic material are executable to cause a memory location that stores the second cryptographic material to store data different from the second cryptographic material.
39. The non-transitory computer-readable storage medium of any of clauses 33-38, wherein deriving the first cryptographic material utilizes a key derivation function with an input dependent on a manner in which the tree structure is being traversed.
40. The non-transitory computer-readable storage medium of any of clauses 33-39, wherein the instructions are executable to cause the computer system to store fewer than all unexpired cryptographic keys corresponding to nodes in the tree while maintaining an ability to derive unstored but unexpired cryptographic keys.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In an embodiment, the user device 902 submits an appropriately configured API request via the network 904 to the system 900. Continuing with the embodiment, the system 900 receives the API request through the web server 906. The API request can be configured as the following example, high-level request: Encrypt(KeyID, Data, Expiration, [AAD]), in which "Data" can specify the data to be encrypted, "KeyID" can specify the key to be utilized to encrypt the data, "Expiration" can specify the expiration time of the data to be encrypted, and "AAD" can specify other additional information. Examples of high level API requests can be found in the description of FIG. 1. Continuing with the embodiment, the system 900 encrypts the data specified by "Data" utilizing the cryptographic key specified by "KeyID" as well as a timestamp key corresponding to the expiration time specified by "Expiration." Continuing with the embodiment, the system 900 encrypts the data through one or more processes involving at least one or more of the components 906-916. Continuing with the embodiment, the data is encrypted such that after the expiration time specified by "Expiration" has passed, the encrypted data is no longer able to be decrypted or accessible by any entity. Continuing with the embodiment, the system 900 responds to the API request with the encrypted data, which is received by the user device 902 through the network 904.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   detecting, at a key management system, a time-based trigger corresponding to a first expiration of a first set of cryptographic keys;
   as a result of detection of the time-based trigger, performing a set of operations to expire the first set of cryptographic keys, the set of operations comprising:
      calculating a first cryptographic key in a tree structure that is usable to derive a second set of cryptographic keys that expire after the first expiration;
      storing the first cryptographic key; and
      destroying a second cryptographic key in the tree structure that is usable to derive a third cryptographic key in the first set of cryptographic keys to cause the key management system to lack an ability to derive the third cryptographic key;
   obtaining, at the key management system, a request to encrypt data, the request indicating a second expiration;
   using the first cryptographic key to derive a fourth cryptographic key corresponding to the second expiration; and
   using, in response to the request, the fourth cryptographic key to generate ciphertext that is undecryptable after the second expiration.

2. The computer-implemented method of claim 1, wherein, in the tree structure, the second cryptographic key corresponds to a first time range, and the first cryptographic key is calculated from the second cryptographic key and corresponds to a second time range within the first time range.

3. The computer-implemented method of claim 1, wherein:
   the second set of cryptographic keys comprises a plurality of cryptographic keys calculable by cryptographic ratcheting the first cryptographic key, and
   the key management system expires the first set of cryptographic keys without ever having stored at least a subset of the first set of cryptographic keys.

4. The computer-implemented method of claim 1, wherein the ciphertext is caused to be undecryptable as a result of the key management system being unable to derive the second cryptographic key after the second expiration.

5. A system, comprising:
   one or more processors; and
   memory that stores computer-executable instructions executable to cause the system to:
      store cryptographic material that is sufficient to derive, according to a tree structure, a plurality of cryptographic keys with respective expirations; and
      update the stored cryptographic material, wherein the computer-executable instructions are executable to update the stored cryptographic material by at least:
         deriving second cryptographic material from the stored cryptographic material;
         storing the second cryptographic material; and
         destroying a portion of the stored cryptographic material to prevent the system from being able to derive cryptographic keys of the plurality of cryptographic keys that have expired while still being able to derive, using the tree structure, cryptographic keys of the plurality of cryptographic keys that have yet to expire.

6. The system of claim 5, wherein the tree structure comprises:
- a parent node corresponding to a time interval such that the parent node is usable to derive cryptographic keys that expire within the time interval;
- a first child node derived from the parent node and corresponding to a first sub-interval within the time interval such that the first child node is usable to derive cryptographic keys that expire within the first sub-interval; and
- a second child node derived from the parent node and corresponding to a second sub-interval within the time interval such that the second child node is usable to derive cryptographic keys that expire within the second sub-interval.

7. The system of claim 5, wherein the tree structure comprises a plurality of levels, the plurality of levels individually comprising nodes calculable by cryptographic ratcheting.

8. The system of claim 5, wherein the plurality of cryptographic keys are symmetric cryptographic keys.

9. The system of claim 5, wherein the computer-executable instructions are executable to cause the system to update the stored cryptographic material based on a time-based trigger.

10. The system of claim 5, wherein, after updating the stored cryptographic material, the system stores fewer than all of the cryptographic keys that have yet to expire.

11. The system of claim 5, wherein:
- the system operates according to a first time source;
- the system comprises a subsystem that operates according to a second time source; and
- for a limited time after updating the stored cryptographic material, the subsystem is capable of deriving cryptographic keys of the plurality of cryptographic keys that have expired.

12. A non-transitory computer-readable storage medium storing thereon executable instructions that, as a result of being executed by one or more processors of a computer system, cause the computer system to at least:
- detect a time-based trigger; and
- in response to detection of the time-based trigger, update stored cryptographic material by at least deriving first cryptographic material and destroying second cryptographic material, the first cryptographic material and the second cryptographic material being derived from a common node in a tree structure, wherein the first cryptographic material corresponds to a set of unexpired keys and the second cryptographic material corresponds to a set of expired keys.

13. The non-transitory computer-readable storage medium of claim 12, wherein the time-based trigger is reaching a time corresponding to expiration of at least one key.

14. The non-transitory computer-readable storage medium of claim 12, wherein the executable instructions that are executable to cause the system to update the material are further executable to cause the system to instruct a hardware security module to perform said deriving and said destroying.

15. The non-transitory computer-readable storage medium of claim 12, wherein the second cryptographic material corresponds to a time interval and destruction of the second cryptographic material prevents an ability to derive any cryptographic keys with expirations occurring in the time interval.

16. The non-transitory computer-readable storage medium of claim 12, wherein the executable instructions that are executable to cause the computer system to derive the first cryptographic material are further executable to cause the computer system to obtain third cryptographic material in the tree structure and cryptographically ratchet the third cryptographic material to obtain the first cryptographic material.

17. The non-transitory computer-readable storage medium of claim 12, wherein the executable instructions that are executable to cause the computer system to update the stored cryptographic material are further executable to cause a memory location that stores the second cryptographic material to store data different from the second cryptographic material.

18. The non-transitory computer-readable storage medium of claim 12, wherein deriving the first cryptographic material utilizes a key derivation function with an input dependent on a manner in which the tree structure is being traversed.

19. The non-transitory computer-readable storage medium of claim 12, wherein the executable instructions are further executable to cause the computer system to store fewer than all unexpired cryptographic keys corresponding to nodes in the tree structure while maintaining an ability to derive unstored but unexpired cryptographic keys.

\* \* \* \* \*